United States Patent
Tabuchi et al.

(10) Patent No.: US 7,978,225 B2
(45) Date of Patent: Jul. 12, 2011

(54) IMAGE RECORDING APPARATUS, IMAGE PLAYBACK CONTROL APPARATUS, IMAGE RECORDING AND PLAYBACK CONTROL APPARATUS, PROCESSING METHOD THEREFOR, AND PROGRAM FOR ENABLING COMPUTER TO EXECUTE SAME METHOD

(75) Inventors: Tatsuhito Tabuchi, Chiba (JP); Yuji Saitou, Tokyo (JP); Takeshi Harada, Tokyo (JP); Masahiro Takahashi, Kanagawa (JP); Mitsuo Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 913 days.

(21) Appl. No.: 11/340,567

(22) Filed: Jan. 27, 2006

(65) Prior Publication Data
US 2006/0182436 A1 Aug. 17, 2006

(30) Foreign Application Priority Data

Feb. 10, 2005 (JP) .................................. 2005-034693

(51) Int. Cl.
H04N 5/225 (2006.01)
H04N 5/76 (2006.01)
H04N 5/228 (2006.01)
G03B 17/18 (2006.01)
G03B 17/24 (2006.01)

(52) U.S. Cl. ............... 348/220.1; 348/231.4; 348/222.1; 396/287; 396/310

(58) Field of Classification Search ............... 348/220.1, 348/231.4, 222.1; 396/287, 310
See application file for complete search history.

(56) References Cited

U.S. PATENT DOCUMENTS

| | | | | |
|---|---|---|---|---|
| 5,726,708 A * | 3/1998 | Sakai et al. | ................ | 348/231.4 |
| 6,185,362 B1 * | 2/2001 | Yoo | .................................. | 386/54 |
| 6,801,714 B2 * | 10/2004 | Kitazawa et al. | ............. | 386/120 |
| 7,110,025 B1 * | 9/2006 | Loui et al. | ................... | 348/220.1 |
| 2002/0030749 A1 * | 3/2002 | Nakamura et al. | ............ | 348/220 |
| 2002/0140826 A1 | 10/2002 | Sato et al. | | |
| 2003/0072561 A1 * | 4/2003 | Terada | ............................ | 386/95 |
| 2003/0095191 A1 * | 5/2003 | Saito | .......................... | 348/220.1 |
| 2004/0022522 A1 | 2/2004 | Terada | | |
| 2004/0041917 A1 * | 3/2004 | Norcross et al. | ........... | 348/220.1 |

(Continued)

FOREIGN PATENT DOCUMENTS

EP 0 899 666 A1 3/1999

(Continued)

*Primary Examiner* — David L Ometz
*Assistant Examiner* — Quang V Le
(74) *Attorney, Agent, or Firm* — Oblon, Spivak, McClelland, Maier & Neustadt, L.L.P.

(57) ABSTRACT

An image recording/playback control apparatus includes a moving image capturing section capturing a moving image and generating moving image data; a still image capturing section capturing a still image and generating still image data; a still image information generation section generating still image information in which the moving image data and the still image data are associated with each other by an image-capturing time; moving and still image coding sections coding the moving and still image data, respectively; a recording section recording the coded moving and still image data; a separation section separating the coded moving and still image data; moving and still image decoding sections decoding the coded moving and still image data, respectively; a still image information indication section indicating the moving or still image data; a selection section selecting the moving and still image data; and a display control displaying the moving or still image data.

23 Claims, 17 Drawing Sheets

U.S. PATENT DOCUMENTS

| | | | |
|---|---|---|---|
| 2004/0141653 A1* | 7/2004 | Kishi | 382/232 |
| 2004/0165106 A1* | 8/2004 | Nakagawa | 348/373 |
| 2004/0201747 A1* | 10/2004 | Woods | 348/231.99 |
| 2005/0190274 A1* | 9/2005 | Yoshikawa et al. | 348/231.99 |

FOREIGN PATENT DOCUMENTS

| | | |
|---|---|---|
| JP | 2002-290908 | 10/2002 |
| JP | 2004-304425 | 10/2004 |
| JP | 2004-312218 | 11/2004 |

* cited by examiner

FIG. 8

| ARI_PCK | ADDITIONAL RECORDING INFORMATION IDENTIFIER | |
|---|---|---|
| | ARI_DAT_ID | ADDITIONAL RECORDING INFORMATION DATA IDENTIFIER |
| | ARI_DAT_VER | ADDITIONAL RECORDING INFORMATION VERSION |
| | APPLICATION INFORMATION | |
| | VND_NAME | VENDER NAME |
| | PRD_NAME | PRODUCT NAME |
| | | ⋮ |
| | RECORDING TIME INFORMATION | |
| | VOBU_LCL_TM_ZOME | TIME ZONE WHEN ARI_DATA IS RECORDED |
| | VOBU_REC_TM | ARI_DATA RECORDING TIME |
| | CAMERA INFORMATION | |
| | F_NUM | F NUMBER |
| | EXP_TM | EXPOSURE TIME |
| | | ⋮ |
| | STILL IMAGE INFORMATION | |
| | PCT_DP | STILL IMAGE DISPLAY |
| | PCT_NAME | STILL IMAGE FILE NAME |
| | | ⋮ |

FIG. 16

| STILL IMAGE PHOTO-GRAPHING DATE AND TIME 881 | STILL IMAGE DATA FILE NAME 882 | STILL IMAGE DISPLAY 883 |
|---|---|---|
| 04/01/01 AM 10:46.23.121 | IMG1.jpg | DISPLAY |
| 04/01/01 PM 12:50.45.234 | IMG2.jpg | NON-DISPLAY |
| 04/01/01 PM 12:55.12.876 | IMG3.jpg | DISPLAY |
| 04/01/01 PM 12:56.00.456 | IMG4.jpg | NON-DISPLAY |
| ⋮ | ⋮ | ⋮ |

872

IMAGE RECORDING APPARATUS, IMAGE PLAYBACK CONTROL APPARATUS, IMAGE RECORDING AND PLAYBACK CONTROL APPARATUS, PROCESSING METHOD THEREFOR, AND PROGRAM FOR ENABLING COMPUTER TO EXECUTE SAME METHOD

CROSS REFERENCES TO RELATED APPLICATIONS

The present invention contains subject matter related to Japanese Patent Application JP 2005-034693 filed in the Japanese Patent Office on Feb. 10, 2005, the entire contents of which are incorporated herein by reference.

BACKGROUND OF THE INVENTION

1. Field of the Invention

The present invention relates to an image recording apparatus having a function for performing recording so that a still image is displayed while a moving image is being played back, an image playback control apparatus for controlling the playback of recorded data, a processing method therefor, and a program for enabling a computer to execute the method.

2. Description of the Related Art

In recent years, types of video cameras that are capable of capturing a moving image and a still image and that have both functions of a video camera and a digital still camera of the related art have increased. Furthermore, types of video cameras that are capable of simultaneously recording a still image while a moving image is being captured have increased. Most video cameras capable of simultaneously recording a still image while a moving image is being captured are such that, when the image-captured data is to be played back, a moving image desired to be played back or a still image desired to be displayed is selected from, for example, a menu screen displayed in a thumbnail format, and the moving image and the still image are played back independently of each other so that, for the moving image, only the moving image is played back, and for the still image, only the still image is played back.

When an image-taking person simultaneously captures a moving image and a still image in practice, in most cases, a still image is captured at the decisive moment while a moving image is being captured. In the case of a video camera of the related art, the moving image and the still image that should have been recorded simultaneously are played back independently of each other, and thus, it is difficult to feel a sense of realism. If the simultaneously recorded moving image and still image can be displayed in such a manner as to be switched from the playback of the moving image to the still image and is displayed at the timing the still image was captured while the moving image is being captured even if a user is not conscious of that fact, the sense of realism at the time of image capturing can be enjoyed.

In order to solve such problems, a technology has been proposed in which, when a still image is being captured while a moving image is being captured, these pieces of data are stored in such a manner as to be associated with each other, the information is clearly expressed to the user during playback, and by freely switching between the moving image and the still image by the user, images are displayed in such a manner as to have an association between the simultaneously recorded moving image and still image also during playback (refer to, for example, Japanese Unexamined Patent Application Publication No. 2004-312218 (FIG. 12)).

SUMMARY OF THE INVENTION

However, although in the above-described technology, the searchability of a simultaneously recorded still image has been improved, it is necessary for the user to consciously switch between a moving image and a still image. Unless the display is performed by changing from a moving image to a still image at the timing at which the still image was captured while the moving image was being captured even if the user is not conscious of that fact, the sense of realism at the time of image capturing is half-reduced.

Accordingly, it is desirable to provide an image recording/playback apparatus capable of displaying still image data while a moving image is being captured, at the timing at which the still image was captured while the moving image was being captured even if the user does not consciously switch between a simultaneously recorded moving image and still image.

The present invention has been made to solve the above-described problems. According to an embodiment of the present invention, there is provided an image recording apparatus including: moving image capturing means for capturing a moving image and generating moving image data; still image capturing means for capturing a still image and generating still image data; still image information generation means for generating still image information in which the moving image data and the still image data are associated with each other by an image-capturing time; and recording means for recording the moving image data, the still image data, and the still image information on a recording medium. This brings about the effect that data is recorded on a recording medium in a form in which the still image data is displayed while a moving image is being played back, at the timing at which the still image was captured while the moving image was being captured.

In this embodiment, in the recording means, the still image information can be recorded as additional recording information contained in a video object unit. This brings about the effect that data is recorded on a recording medium in a form in which the moving image data, the still image data, and the still image information are recorded together on a DVD disc in compliance with the DVD-Video standard, and still image data is displayed while the moving image is being played back at the timing at which the still image was captured while the moving image was being played back.

In this embodiment, the still image information contains information in which a file identifier of the still image data is associated with a still image capturing time. This brings about the effect that, even if the moving image data, the audio data, the still image data, and the still image information are recorded on mutually different recording media, the moving image data, the audio data, and the still image data can be associated with one another.

According to another embodiment of the present invention, there is provided an image playback control apparatus including: still image information indication means for indicating moving image data or still image data to be displayed on the basis of still image information in which the moving image data and the still image data are associated with each other by an image-capturing time; selection means for selecting the moving image data or the still image data to be displayed on the basis of an indication from the still image information indication means; and display control means for displaying the moving image data or the still image data selected by the selection means. This brings about the effect that the still image data can be displayed while the moving image is being played back at the timing at which the still image was captured while the moving image was being captured.

In this embodiment, the image playback control apparatus may further include display time setting means for setting a period of time during which the still image data is displayed, wherein the selection means may select the still image data for the period of time corresponding to the period of time set by the display time setting means. This brings about the effect that the time at which the still image data is displayed while the moving image is being played back can be freely set.

In this embodiment, the image playback control apparatus may further include still image display setting means for setting the still image data to be displayed, wherein the selection means may make a selection by targeting the still image data set by the still image display setting means. This brings about the effect that the still image data that is desired to be displayed and the still image data that is not desired to be displayed while the moving image is being played back can be set.

In this embodiment, the image playback control apparatus may further include first superposition means for displaying the still image data in such a manner that image effect data is superposed on the still image data when the still image data is displayed. This brings about the effect that, when the still image data is to be displayed, the image effect data can be displayed together with the still image data.

In this embodiment, the image playback control apparatus may further include second superposition means for displaying the still image data in such a manner that the image effect data is superposed on the still image data while the still image data is being displayed. This brings about the effect that the image effect data can be displayed together with the still image data while the still image data is being displayed.

In this embodiment, the still image information may be additional recording information contained in a video object unit. This brings about the effect that the still image data can be displayed while the moving image is being played back at the timing at which the still image was captured while the moving image was being captured even if a DVD disc, on which the moving image data, the still image data, and the still image information are recorded together in compliance with the DVD-Video standard, is played back.

In this embodiment, the still image information may contain information in which a file identifier of the still image data is associated with the image-capturing time. This brings about the effect that the moving image data, the audio data, the still image data, and the still image information that are recorded on mutually different recording media can be associated between the moving image data and the audio data; and the still image data.

In this embodiment, the image playback control apparatus may further include audio control means for playing back audio data synchronized with the moving image data. This brings about the effect that the still image data is displayed and audio is played back at the timing at which the still image was captured while the moving image was being captured.

The image playback control apparatus may further include, in addition to the audio control means, sound effect supply means for supplying sound effect data for a predetermined time when the still image data is displayed. This brings about the effect that the sound effect data can be played back when the still image data is displayed.

The image playback control apparatus may further include, in addition to the audio control means, audio signal indication means for indicating whether or not the audio data should be supplied while the still image data is being displayed; and audio switching means for switching the audio data on the basis of the indication by the audio signal indication means. This brings about the effect that the playback of the audio data is suppressed while the still image data is being displayed.

According to another embodiment of the present invention, there is provided an image playback apparatus including: still image information indication means for indicating moving image data or still image data to be displayed on the basis of still image information in which the moving image data and the still image data are associated with each other by an image-capturing time; selection means for selecting the moving image data or the still image data to be displayed on the basis of an indication from the still image information indication means; and display means for displaying the moving image data or the still image data selected by the selection means. This brings about the effect that the still image data can be displayed while the moving image data is being played back at the timing at which the still image was captured while the moving image was being captured.

According to another embodiment of the present invention, there is provided an image recording and playback control apparatus including: moving image capturing means for capturing a moving image and generating moving image data; still image capturing means for capturing a still image and generating still image data; still image information generation means for generating still image information in which the moving image data and the still image data are associated with each other by an image-capturing time; moving image coding means for coding the moving image data; still image data coding means for coding the still image data; recording means for recording the coded moving image data, the coded still image data, and the still image information on a recording medium; separation means for separating the coded moving image data, the coded still image data, and the still image information, which are recorded, from one another; moving image decoding means for decoding the coded moving image data; still image decoding means for decoding the coded still image data; still image information indication means for indicating the moving image data or the still image data to be displayed on the basis of the still image information; selection means for selecting the moving image data or the still image data to be displayed on the basis of an indication from the still image information indication means; and display control means for displaying the moving image data or the still image data selected by the selection means. This brings about the effect that the moving image data and the still image data can be recorded in such a manner as to be associated with each other, and when the moving image is to be played back, the still image data can be displayed at the timing at which the still image was captured while the moving image was being captured.

According to another embodiment of the present invention, there is provided an image recording method including the steps of: capturing a moving image and generating moving image data; capturing a still image and generating still image data; generating still image information in which the moving image data and the still image data are associated with each other by an image-capturing time; and recording the moving image data, the still image data, and the still image information on a recording medium. This brings about the effect that data is recorded on a recording medium in a form in which the still image data is displayed while the moving image data is being played back at the timing at which the still image was captured while the moving image was being captured.

According to another embodiment of the present invention, there is provided an image playback control method including the steps of: indicating moving image data or still image data to be displayed on the basis of still image information in which the moving image data and the still image data are associated with each other by an image-capturing time; selecting the moving image data or the still image data to be displayed on the basis of an indication from the still image information indication step; and displaying the moving image data or the still image data selected by the selection step. This brings about the effect that the still image data is displayed while the moving image is being played back at the timing at which the still image was captured while the moving image was being captured.

According to another embodiment of the present invention, there is provided a program for enabling a computer to execute processing including the steps of: capturing a moving image and generating moving image data; capturing a still image and generating still image data; generating still image information in which the moving image data and the still image data are associated with each other by an image-capturing time; and recording the moving image data, the still image data, and the still image information on a recording medium. This brings about the effect that data is recorded on a recording medium in a form in which the still image data is displayed while the moving image data is being played back at the timing at which the still image was captured while the moving image was being captured.

According to another embodiment of the present invention, there is provided a program for enabling a computer to execute processing including the steps of: indicating moving image data or still image data to be displayed on the basis of still image information in which the moving image data and the still image data are associated with each other by an image-capturing time; selecting the moving image data or the still image data to be displayed on the basis of an indication from the still image information indication step; and displaying the moving image data or the still image data selected by the selection step. This brings about the effect that the still image data is displayed while the moving image is being played back at the timing at which the still image was captured while the moving image was being captured.

According to the embodiments of the present invention, superior advantages that still image data can be displayed while a moving image is being played back at the timing at which a still image was captured while the moving image was being captured, can be obtained.

BRIEF DESCRIPTION OF THE DRAWINGS

FIG. 8 shows data structure of additional recording information (ARI_PCK) in the embodiment of the present invention;

FIG. 16 shows a still image correspondence table; and

DESCRIPTION OF THE PREFERRED EMBODIMENTS

Embodiments of the present invention will now be described below in detail with reference to the drawings.

Figure 1:
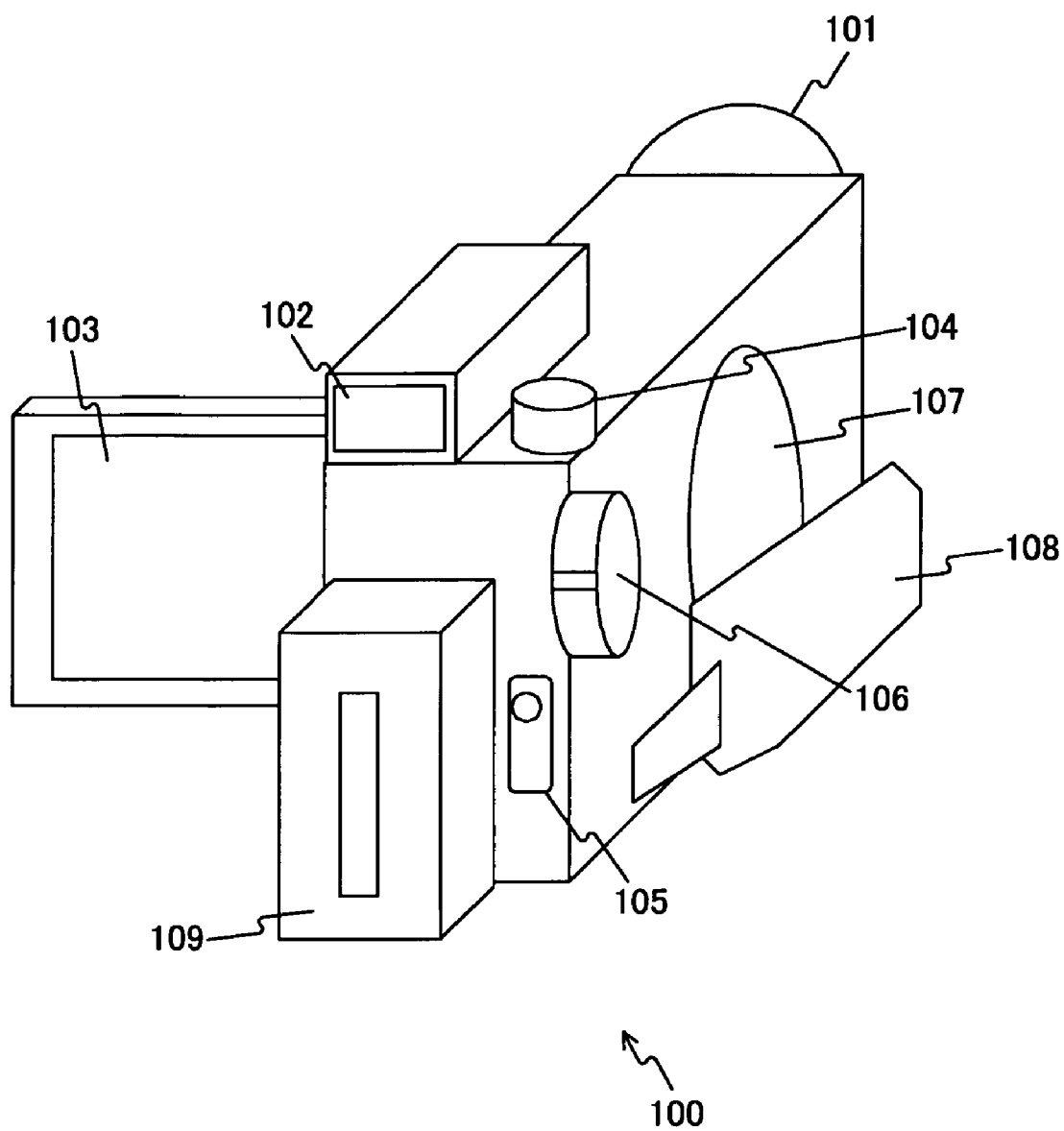
FIG. 1 shows an example of the exterior of an image recording playback apparatus 100 according to an embodiment of the present invention.

FIG. 1 shows an example of the exterior of an image recording playback apparatus 100 according to an embodiment of the present invention. The image recording playback apparatus 100 includes a lens section 101, a viewfinder section 102, a liquid-crystal display section 103, a still image capturing button section 104, a moving image capturing button 105, a power switch 106, a recording medium storage section 107, a holding support member 108, and a battery section 109.

The lens section 101 serves to cause the image of a subject to be captured to be formed into an image on an image-capturing device, such as a CCD (Charge Coupled Device). The viewfinder section 102 serves for a photographer to view the subject during image capturing. This viewfinder section 102 can be optical or electronical. The liquid-crystal display section 103 serves to cause an image of the subject captured by the lens section 101 to be displayed and also serves to cause image data to be displayed while the image data is being played back. Furthermore, the liquid-crystal display section 103 is often attached with a touch panel operation function for operating an image recording playback apparatus by depressing the screen surface of the liquid-crystal display section with a finger, etc. Also, in the embodiment of the present invention, the liquid-crystal display section 103 may be attached with a touch panel operation function. The liquid-crystal display section 103 is formed of, for example, an LCD (Liquid Crystal Display), and in addition, may be formed of another organic EL display (electroluminescent display).

The still image capturing button section 104 is a button that is depressed when a still image is captured. The moving image capturing button 105 is a button that is depressed when a moving image is captured. The power-supply switch 106 is a switch for starting up the image recording playback apparatus 100 in the embodiment of the present invention. The recording medium storage section 107 stores a recording medium, such as a DVD disc. The holding support member 108 is a support member for holding the image recording playback apparatus 100 in the embodiment of the present invention. The battery section 109 supplies power to the image recording playback apparatus 100 in the embodiment of the present invention.

Figure 2:
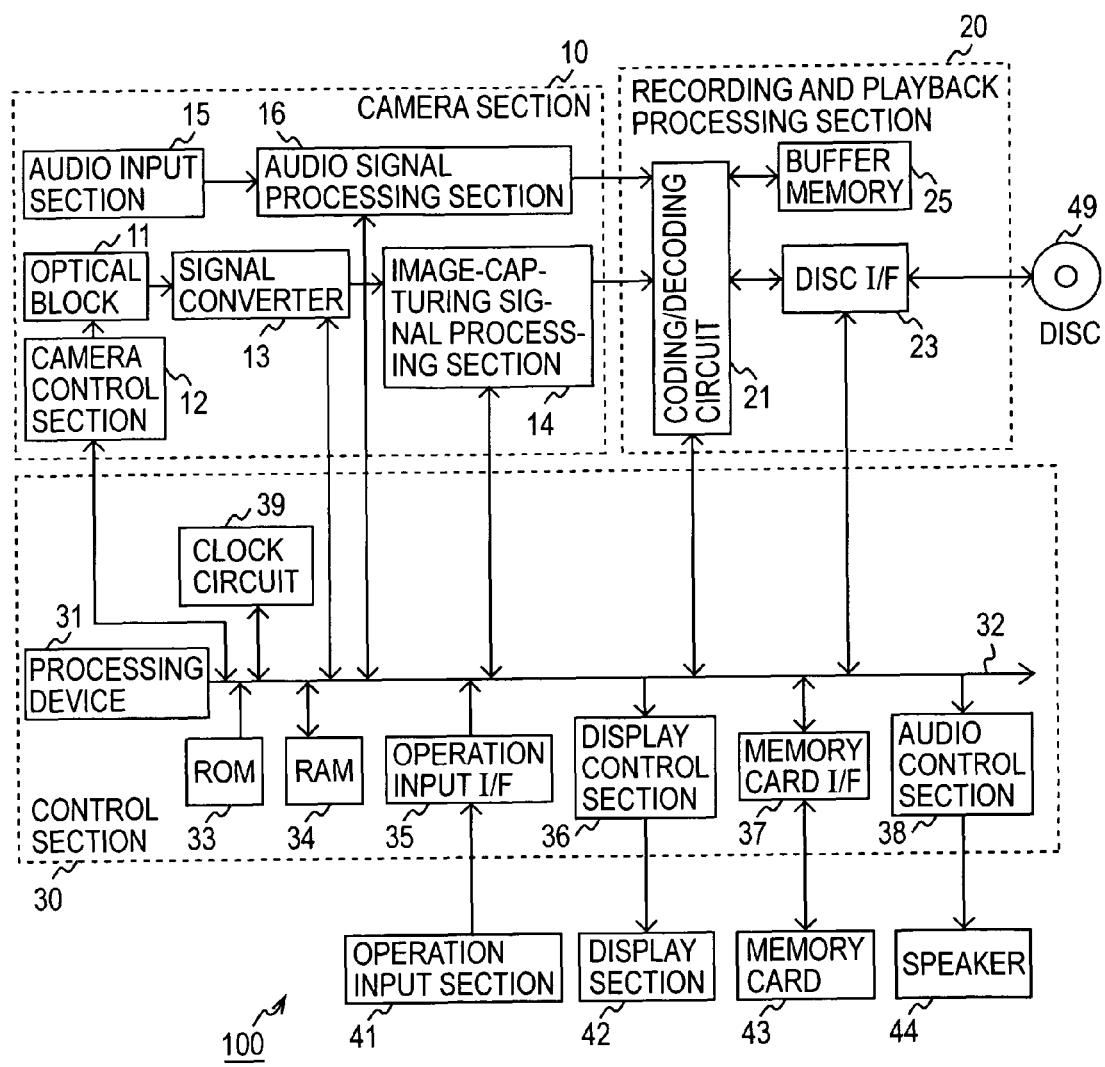
FIG. 2 shows an example of the configuration of the image recording playback apparatus 100 according to the embodiment of the present invention.

FIG. 2 shows an example of the configuration of the image recording playback apparatus 100 according to the embodiment of the present invention. This image recording playback apparatus 100 includes a camera section 10, a recording playback processing section 20, and a control section 30.

The camera section 10 includes an optical block 11, a camera control section 12, a signal converter 13, a image-capturing signal processing section 14, an audio input section 15, and an audio signal processing section 16. The optical block 11 includes therein a lens group for capturing the image of a subject, an aperture adjustment mechanism, a focus adjustment mechanism, a zoom mechanism, a shutter mechanism, a flash mechanism, a camera shake correction mechanism, etc. Upon receiving a control signal from the control section 30, the camera control section 12 generates a control signal to be supplied to the optical block 11. The generated control signal is supplied to the optical block 11, so that zoom control, shutter control, and exposure control are performed.

The signal converter 13 is formed of an photographing device, such as a CCD, and an image is formed on the image forming plane thereof through an optical block 11. Upon receiving an image receiving timing signal supplied from the control section 30 in response to a shutter operation, this signal converter 13 converts the subject image formed on the image forming plane into an image-capturing signal and supplies it to the image-capturing signal processing section 14.

On the basis of the control signal from the control section 30, the image-capturing signal processing section 14 performs processing, such as gamma correction and AGC (Auto Gain Control), on the image-capturing signal, and also performs a process for converting the image-capturing signal into an image signal as a digital signal. The audio input section 15 collects sound in the vicinity of the subject during image capturing. The audio signal from the audio input section 15 is supplied to the audio signal processing section 16. On the basis of the control signal from the control section 30, the audio signal processing section 16 performs processing, such as correction and AGC, on the audio signal, and also performs a process for converting the audio signal into a digital signal.

The recording playback processing section 20 includes a coding/decoding circuit 21, a disc interface 23, and a buffer memory 25.

The coding/decoding circuit 21 has a coding function for coding the image signal, the audio signal, etc., from the camera section 10 so as to be multiplexed and converted into compression data. On the basis of the control signal from the control section 30, the coding/decoding circuit 21 further performs automatic white balance control, exposure correction control, magnification control corresponding to a digital zoom magnification, etc., on the image signal from the image-capturing signal processing section 14.

Upon receiving the compression data from the coding/decoding circuit 21, the disc interface 23 writes the compression data into the disc 49. Furthermore, the disc interface 23 reads the compression data from the disc 49 and supplies it to the coding/decoding circuit 21. The buffer memory 25 is formed of, for example, an SDRAM, and is used as a work area for coding or decoding in the coding/decoding circuit 21.

The control section 30 is configured in such a manner that a processing device 31, a ROM (Read Only Memory) 33, a RAM (Random Access Memory) 34, an operation input interface 35 for connecting an operation input section 41, a display control section 36 for connecting a display section 42, a memory card interface 37 for loading a memory card 43, an audio control section 38 for connecting a speaker 44, and a clock circuit 39 for recording the image-capturing time are connected to one another via a system bus 32.

The processing device 31 centrally controls the overall control section 30 and uses the RAM 34 as a work area. In the ROM 33, programs for controlling the camera section 10 and programs for performing recording control and playback control of the image signal and the audio signal are written.

The operation input section 41 connected to the operation input interface 35 is provided with a plurality of keys, such as a mode switching key for switching between the image-capturing mode and another mode such as the playback mode, a zoom adjustment key, a key for exposure adjustment, a shutter key, a moving image capturing key, and a display adjustment key in the display section 42. The operation input interface 35 transmits an operation signal from the operation input section 41 to the processing device 31. The processing device 31 makes a determination as to which key is operated in the operation input section 41, and performs a control process corresponding to the determination result.

The display section 42 connected to the display control section 36 is formed of, for example, an LCD, and displays an image signal from the camera section 10 and an image signal read from the disc 49 under the control of the processing device 31. The display section 42 constitutes a part of the functions of the liquid-crystal display section 103 of FIG. 1.

The memory card interface 37 writes the compression data from the coding/decoding circuit 21 into the memory card 43. Furthermore, the memory card interface 37 reads the compression data from the memory card 43 and supplies it to the coding/decoding circuit 21. The clock circuit 39 generates time information indicating year, month, day, hour, minute, second, etc.

The speaker 44 connected to the audio control section 38 plays back an audio signal from the camera section 10 and an audio signal read from the disc 49 under the control of the processing device 31.

Figure 3:
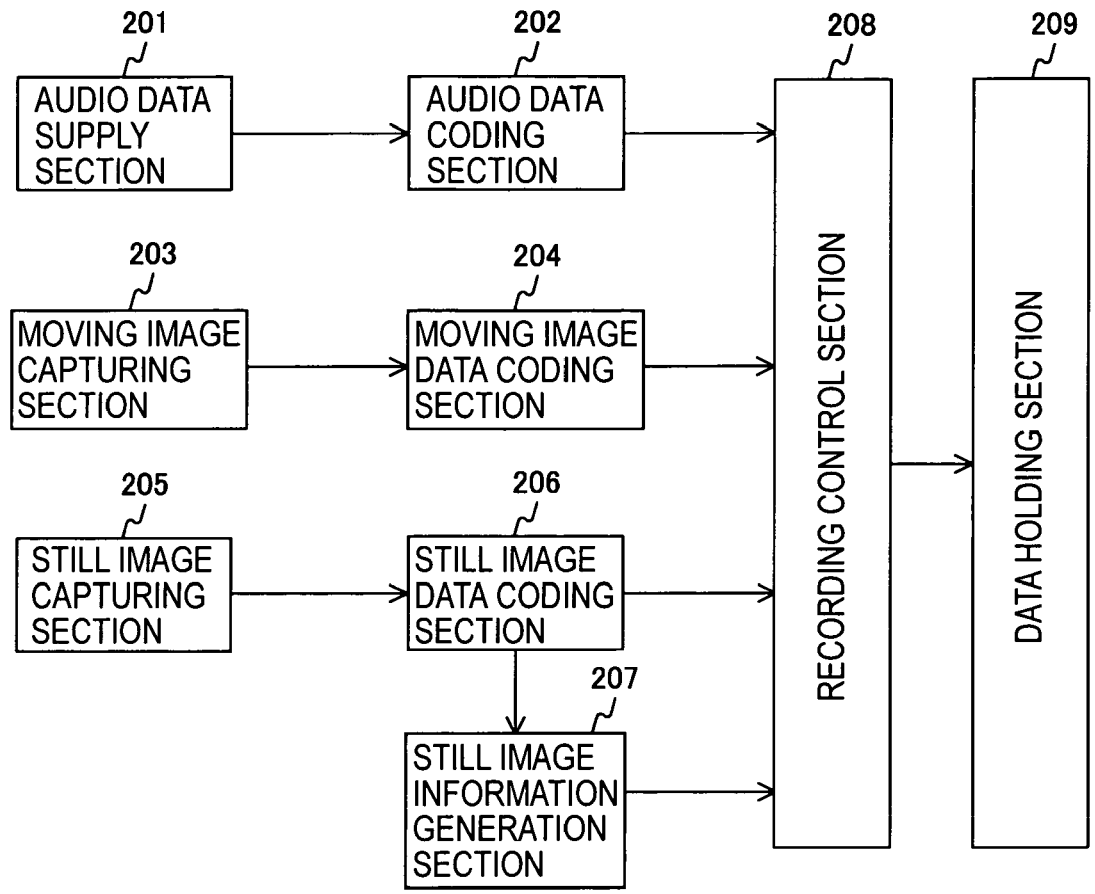
FIG. 3 shows an example of the structure of an image recording function according to the embodiment of the present invention.

FIG. 3 shows an example of the structure of an image recording function in the embodiment of the present invention. This image recording function has an audio data supply section 201, an audio data coding section 202, a moving image capturing section 203, a moving image data coding section 204, a still image capturing section 205, a still image data coding section 206, a still image information generation section 207, a recording control section 208, and a data holding section 209.

The audio data supply section 201 collects sound in the vicinity of a subject during image capturing in order to generate audio data such that sound is converted into a digital signal. Furthermore, the audio data supply section 201 supplies the generated audio data into the audio coding section 202. The audio data coding section 202 codes the audio data supplied from the audio data supply section 201. The audio data is coded in accordance with, for example, the AC-3 (Audio Code number 3) standard.

The moving image capturing section 203 converts the photographed moving image into a digital signal in order to generate moving image data. Furthermore, the moving image capturing section 203 supplies the generated moving image data to the moving image data coding section 206. The moving image data coding section 204 codes the moving image data supplied from the moving image capturing section 203. The moving image data is coded in accordance with, for example, the MPEG-2 (Moving Picture Experts Group-2) standard.

The still image capturing section 205 converts the photographed still image into a digital signal in order to generate still image data. Furthermore, the still image capturing section 205 supplies the generated still image data to the still image data coding section 206. The still image data coding section 206 codes the still image data supplied from the still image capturing section 205. The still image data is coded in accordance with, for example, the JPEG (Joint Photographic Experts Group) standard. Furthermore, the still image data coding section 206 also creates a file name of the still image data and supplies the file name of the still image data to the recording control section 208 and the still image information generation section 207.

The still image information generation section 207 generates still image information for causing the moving image data and the still image data to be associated with each other. Then, the file name of the still image data is supplied from the still image data coding section 206 to the still image information generation section 207, and the still image information generation section 207 contains the file name of the still image data into this still image information.

The moving image data, the still image data, the audio data, and the still image information that are generated in the manner described above are held in the data holding section 209 via the recording control section 208. The data holding section 209 may be, for example, a DVD disc. As will be described later, the moving image data and the audio data may be recorded on a DVD disc, and the still image data and the still image information may be recorded on an external memory such as a flash memory.

The audio data supply section 201 can be realized by, for example, the audio input section 15 and the audio signal processing section 16 of FIG. 2. The moving image capturing section 203 and the still image capturing section 205 can be realized by, for example, the optical block 11, the camera control section 12, the signal converter 13, and the image-capturing signal processing section 14 of FIG. 2. In this case, the moving image capturing section 203 often has a photographing performance of approximately several hundred pixels, and the still image capturing section 205 often has a photographing performance of approximately one million pixels or more. Furthermore, the audio data coding section 202, the moving image data coding section 204, and the still image data coding section 206 can be realized by, for example, the coding/decoding circuit 21 of FIG. 2. The still image information generation section 207 can be mainly realized by, for example, the processing device 31 of FIG. 2. The recording control section 208 can be realized by, for example, the disc interface 23 or the memory card interface 37 of FIG. 2. The data holding section 209 can be realized by, for example, the disc 49 or the memory card 43 of FIG. 2.

Figure 4:
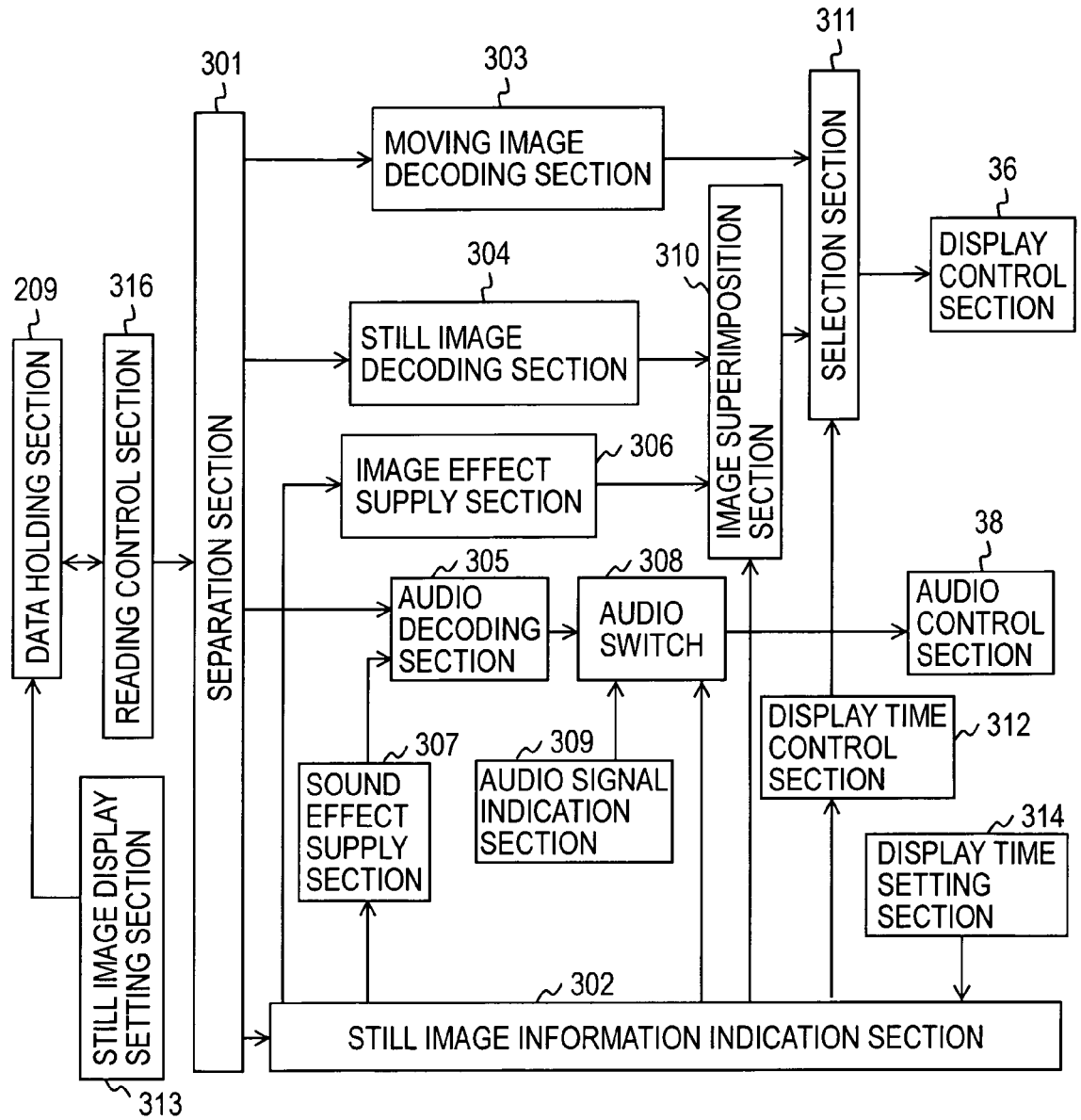
FIG. 4 shows an example of the structure of an image playback control function according to the embodiment of the present invention.

FIG. 4 shows an example of the structure of an image playback control function in the embodiment of the present invention. The image playback control function in the embodiment of the present invention includes a reading control section 316, a separation section 301, a still image information indication section 302, a moving image decoding section 303, a still image decoding section 304, an audio decoding section 305, an image effect supply section 306, a sound effect supply section 307, an audio switch 308, an audio signal indication section 309, an image superposition section 310, a selection section 311, a display time control section 312, a still image display setting section 313, a display time setting section 314, the display control section 36, and the audio control section 38.

The reading control section 316 reads data from the data holding section 315 and supplies the read data to the separation section 301. The separation section 301 separates the data supplied from the reading control section 316 into moving image data, still image data, audio data, and still image information. The separated moving image data, still image data, audio data, and still image information are supplied to the moving image decoding section 303, the still image decoding section 304, the audio decoding section 305, and the still image information indication section 302, respectively.

The moving image decoding section 303 decodes the moving image data that is coded in accordance with, for example, the MPEG standard. The still image decoding section decodes the still image data coded in accordance with, for example, the JPEG standard. The audio decoding section 305 decodes the audio data coded in accordance with, for example, the AC-3 standard. On the basis of the still image information, the still image information indication section 302 controls the image effect supply section 306, the sound effect supply section 307, the audio switch 308, the image superposition section 310, the display time control section 312, and the selection section 311.

In the image effect supply section 306, a plurality of pieces of image data for providing special effects in a visual manner (hereinafter called "image effect data") when an image is to be played back are held. The image effect supply section 306 supplies predetermined image effect data to the image superposition section 310 at a timing indicated from the still image information indication section 302. In the sound effect supply section 307, a plurality of pieces of audio data for providing special effects in an audio manner (hereinafter called "sound effect data") when an image is to be played back are held. The sound effect supply section 307 supplies predetermined sound effect data to the audio decoding section 305 at a timing indicated from the still image information indication section 302.

The image superposition section 310 superposes together the still image data supplied from the still image decoding section 304 and the image effect data supplied from the image effect supply section 306 at a timing indicated from the still image information indication section 302, and supplies the superposed data to the selection section 311. The superposed data is simultaneously displayed on the display section 42 of FIG. 2, as will be described later with reference to FIGS. 10 and 11. The data in which the still image data and the image effect data are superposed together is hereinafter referred to as "superposition data".

The selection section 311 supplies either the moving image data supplied from the moving image decoding section 303 or the superposition data supplied from the image superposition section 310 to the display control section 36. The timing at which the superposition data supplied from the image superposition section 310 is selected and supplied to the display control section 36 is indicated from the still image information indication section.

The display time setting section 314 sets the time during which the still image data is displayed on the display section 42 (hereinafter referred to as a "still image display time"). The still image display time starts at the timing indicated from the still image information indication section 302, and time is counted in the display time control section 312. The display time control section 312 indicates the termination of the period of time to the selection section 311 when the set time has passed. During the set still image display time, in the selection section 311, the moving image data supplied from the moving image decoding section 303 is not selected, and the superposition data supplied from the image superposition section 310 is selected and supplied to the display control section 36.

The audio signal indication section 309 performs a setting as to whether or not the audio data supplied from the audio decoding section 305 to the audio control section 38 is interrupted for a predetermined time. When it is set in the audio signal indication section 309 that the audio data is interrupted, in the audio switch 308, the audio data supplied from the audio decoding section 305 is interrupted for a predetermined time in accordance with an instruction from the still image information indication section 302. As the time in which the audio data is interrupted, for example, by using the time set in the display time setting section 314, the audio data can be interrupted while a still image is being displayed.

The still image display setting section 313 performs a setting of still image data desired to be displayed when a moving image is to be played back with respect to the still image information within the data held in the data holding section 315. When there are a plurality of pieces of still image information, whether or not a still image should be displayed when a moving image is to be played back can be set in each still image information.

The reading control section 316 can be mainly realized by, for example, the disc interface 23 of FIG. 2. Each of the separation section 301, the still image information indication section 302, the moving image decoding section 303, the still image decoding section 304, the audio decoding section 305, the audio switch 308, the image superposition section 310, the selection section 311, and the display time control section 312 can be realized by, for example, the coding/decoding circuit 21 of FIG. 2. The image effect supply section 306 and the sound effect supply section 307 can be mainly realized by, for example, the processing device 31 and the ROM 33 of FIG. 2. The audio signal indication section 309, the still image display setting section 313, and the display time setting section 314 can be mainly realized by, for example, the operation input section 41, the operation input interface 35, and the processing device 31 of FIG. 2.

Figure 5:
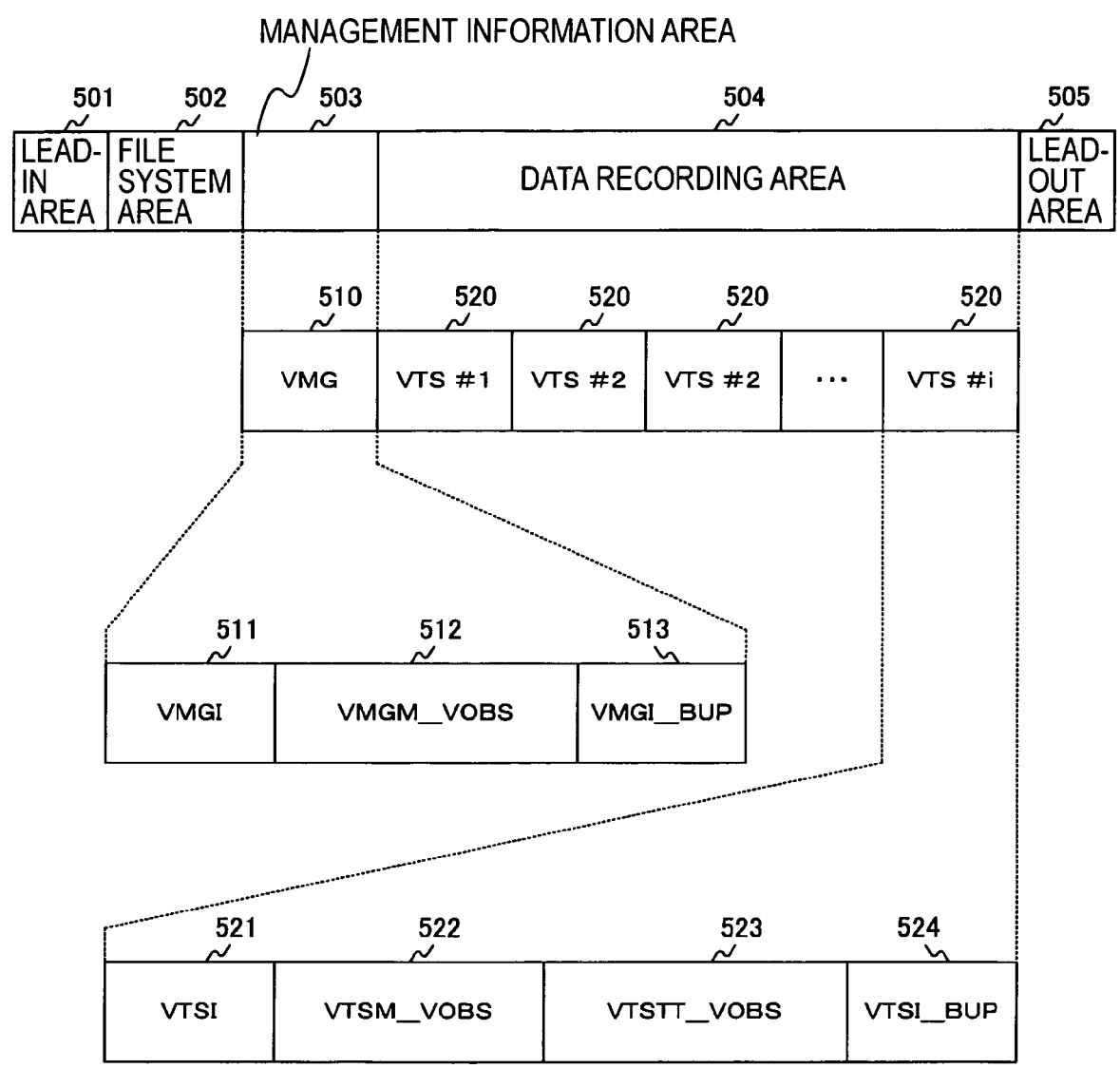
FIG. 5 shows the data structure of a disc when a disc in compliance with the DVD-Video standard is used as a disc 49 in the embodiment of the present invention.

FIG. 5 shows the data structure of a disc when a disc in compliance with the DVD-Video standard is used as the disc 49 in the embodiment of the present invention. The disc is formed in a disc shape, and a lead-in area 501, a file system area 502, a management information area 503, a data recording area 504, and a lead-out area 505 are provided in sequence from the inner region. The file system area 502, which is a management area of the file system, is provided so as to be in compliance with the standards of the ISO 9660 and the UDF (Universal Disc Format). The management information area 503 is an area for holding the management information of all the video content recorded on the disc. The data recording area 504 is an area for holding the content of each video title set and the control information thereof.

In the management information area 503, a VMG (Video ManaGer) 510 is held. This VMG 510 has VMGI (VMG Information) 511, a VMGM_VOBS (Video OBject Set for VMG Menu) 512, and VMGI_BUP (VMGI for Back UP) 513. The VMGI 511 holds the management information for each title of the video content and the control information of the top menu recorded on a disc. The VMGM_VOBS 512 holds the data of the top menu. The VMGI_BUP 513 is a backup copy of the VMGI 511.

In the data recording area 504, at least one VTS (Video Titles Set) 520 is held. Each VTS 520 includes VTSI (VTS Information) 521, a VTSM_VOBS (Video OBject Set for VTS Menu) 522, a VTSTT_VOBS (Video Object Set for Titles in a VTS) 523, and VTSI_BUP (VTSI for Back UP) 524. The VTSI 521 holds the management information and the control information for each chapter of the titles contained in the video title set, and the control information of the chapter menu. The VTSM_VOBS 522 holds the data of the chapter menu. The VTSTT_VOBS 523 holds the data of the title contained in the video title set. The VTSI_BUP 524 is a backup copy of the VTSI 521.

Figure 6:
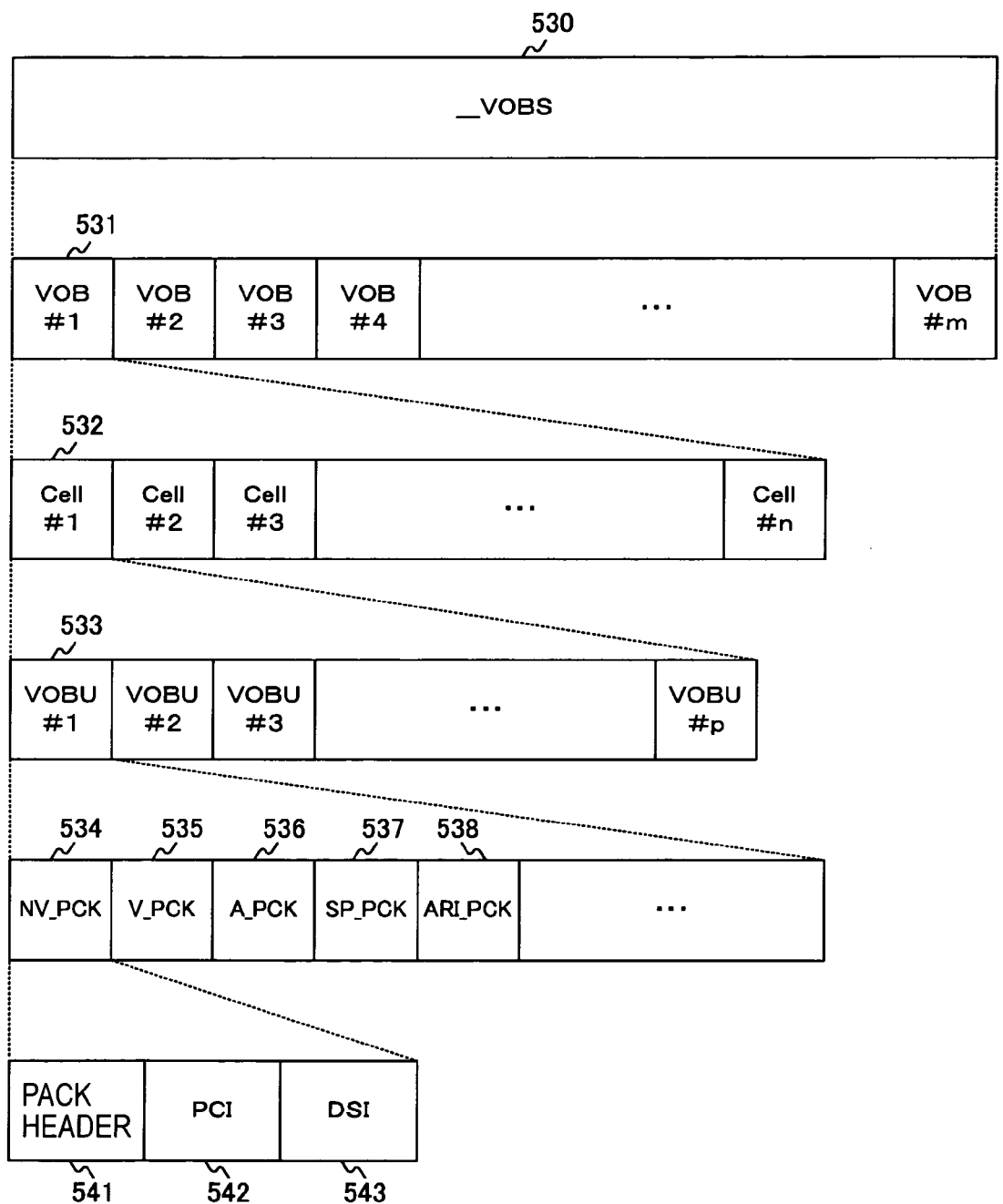
FIG. 6 shows components of a video object set (VOBS)

FIG. 6 shows the components of the video object set (VOBS). The VMGM_VOBS 512, the VTSM_VOBS 522, and the VTSTT_VOBS 523 of FIG. 5 hold each data as a video object set (VOBS), and have a common format. This VOBS 530 is a set of one or more video objects (VOB) 531. This VOB 531 is formed of one or more cells (Cell) 532.

The cell 532 includes one or more video object units (VOBU) 533. This VOBU 533 is a pack sequence with a navigation pack (NV_PCK) 534 being at the beginning. The term "pack" as used herein refers to fixed data. For the packs, in addition to the NV_PCK 534 at the beginning, a video pack (V_PCK) 535 for holding video data, an audio pack (A_PCK) 536 for holding audio data, a sub-picture pack (SP_PCK) 537 for holding sub-picture data, and an additional recording information pack (ARI_PCK) 538 for holding additional recording information, etc., are provided as necessary.

The NV_PCK 534 holds a pack header 541 followed by presentation control information (PCI) 542, and data search information (DSI) 543. The PCI 542 is control information related to playback display. The DSI 543 is control information for accessing the disc.

Figure 7:
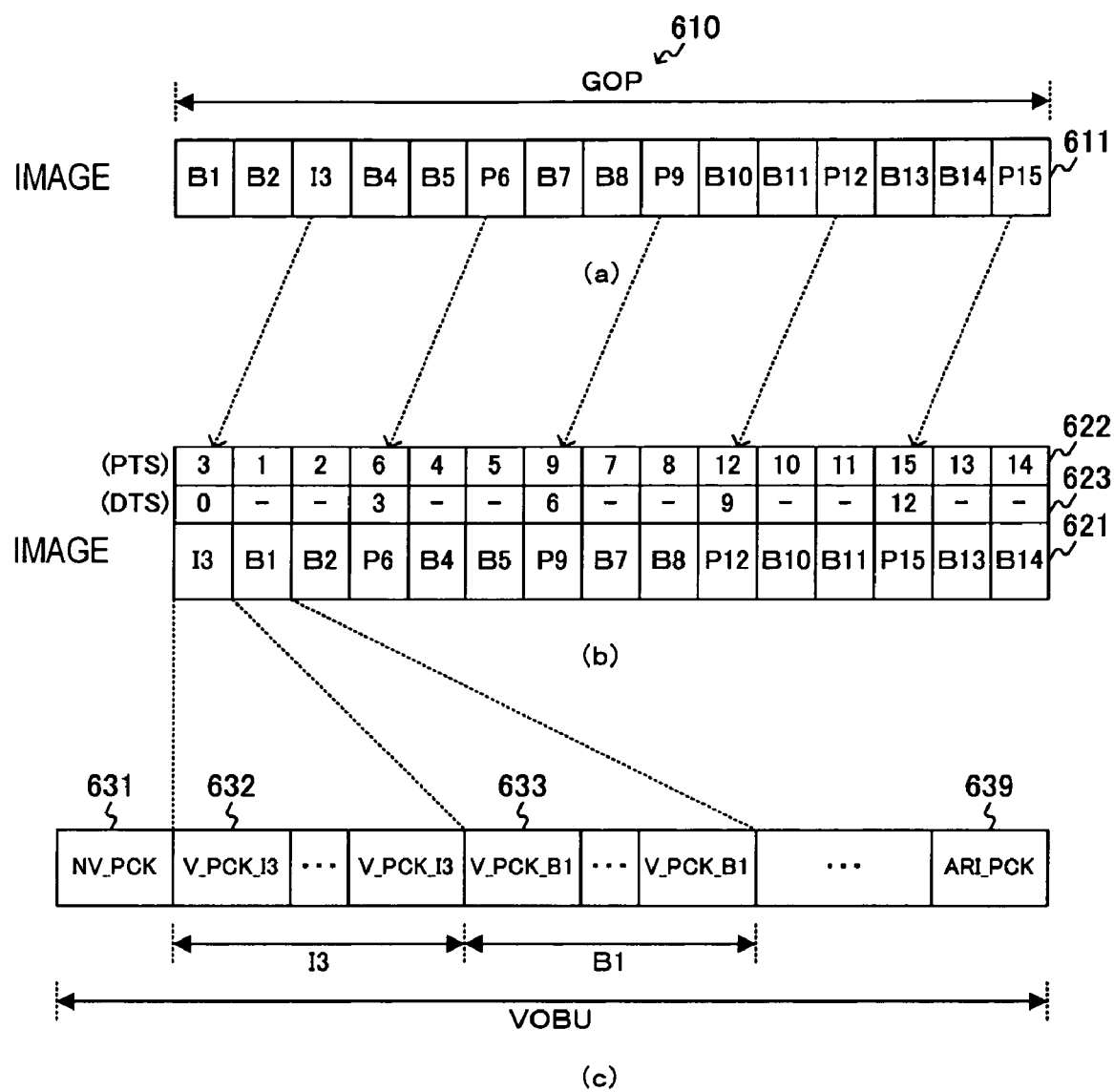
FIG. 7 shows the relationship between the video object unit (VOBU) and a coded image.

FIG. 7 shows the relationship between a video object unit (VOBU) and a coded image. The image data within the VOBS 530 is coded in accordance with the MPEG-2 coding method. In this MPEG-2 coding method, a moving image of approximately 0.5 seconds is represented by 15 images that are called a GOP (Group Of Pictures). In part (a) of FIG. 7, a state is shown in which a total of 15 images 611 composed of one I picture, four P pictures, and 10 B pictures forms a GOP 610. Here, the I picture is an intra-frame coded image and is an image completed of itself, which is coded independently of other P pictures and B pictures. On the other hand, the P picture is coded by using a difference with the temporally preceding I or P picture. The B picture is coded by using a bidirectional difference with the preceding and/or upcoming I or P pictures. Therefore, only the I picture can be decoded independently in the GOP.

The 15 images in the GOP are recorded on the disc in such a manner that the sequences of some of them are rearranged as shown in part (b) of FIG. 7. This is based on the features of the above-described coding method and is for avoiding the waiting for a temporally succeeding image at the time of decoding. For example, in order to decode a B picture (B5), it is necessary to make a reference to an I picture (I3) and a P picture (P6). As a result of performing a rearrangement in part (b) of FIG. 7, necessary image data (I3 and P6) is fully provided at the point in time in which decoding is performed. In order to maintain such a sequence relationship of an image 621, time stamps of a PTS (Presentation Time Stamp) 622 and a DTS (Decoding Time Stamp) 623 are attached. The PTS 622 is time management information for playback output and indicates when the unit image to which the time stamp is attached is played back and output. On the other hand, the DTS 623 is time management information for decoding when the unit image to which the time stamp is attached is decoded.

Each of the coded images is contained in one or more packs, as shown in part (c) of FIG. 7. For example, the I picture (13) is held as V_PCK_I3 (632), and the B picture (B1) is held as V_PCK_B1 (633). These, together with the NV_PCK 631 and the ARI_PCK 639, constitute a VOBU.

FIG. 8 shows the data structure of additional recording information (ARI_PCK) in the embodiment of the present invention. The information contained in this ARI_PCK 639 is broadly classified into five types, that is, additional recording information identifier, application information, recording time information, camera information, and still image information.

The additional recording identifier is an identifier for enabling the fact that the data within the packet is additional recording information to be recognized, with an additional recording information data identifier (ARI_DAT_ID) and a version number (ARI_DAT_VER) thereof being recorded therein.

The application information contains a vender name (VND_NAME) that indicates the manufacturing source of the product, a product name (PRD_NAME) that indicates the product name, etc.

In the recording time information, a time zone (VOBU_LCL_TM_ZONE) when the additional recording information data (ARI_DATA) about the VOBU in which the target additional recording information is contained is recorded, and the recording time (VOBU_REC_TM) of the ARI_DATA, are recorded. The VOBU_REC_TM is described, for example, in year, month, day, hour, minute, and second as the image-capturing time of a frame of an I picture. In the VOBU_LCL_TM_ZONE, a time zone for the VOBU_REC_TM is recorded. The term "time zone" as used herein refers to an offset time from the UTC (Coordinated Universal Time) set in the apparatus by the user. That is, the time zone is a time difference corresponding to the time (local time) of the country where the recording apparatus is used. As the VOBU_REC_TM, a universal time (an official time) that is used when a time is recorded in the whole world can also be used. In that case, the VOBU_LCL_TM_ZONE is set to zero.

The camera information contains information, such as an F number (F_NUM) and an exposure time (EXP_TM), as information such as setting conditions during image capturing.

The still image information contains a still image display (PCT_DP), a still image data file name (PCT_NAME), etc. The still image display is information that indicates as to whether or not a corresponding still image is displayed during playback. The still image data file name is the file name of a file containing still image data. When the still image data is coded in accordance with the JPEG standard, the still image data file name becomes in the format of, for example, "IMG1.jpg". This still image information is generated by the still image information generation section 207 of FIG. 3.

Figure 9:
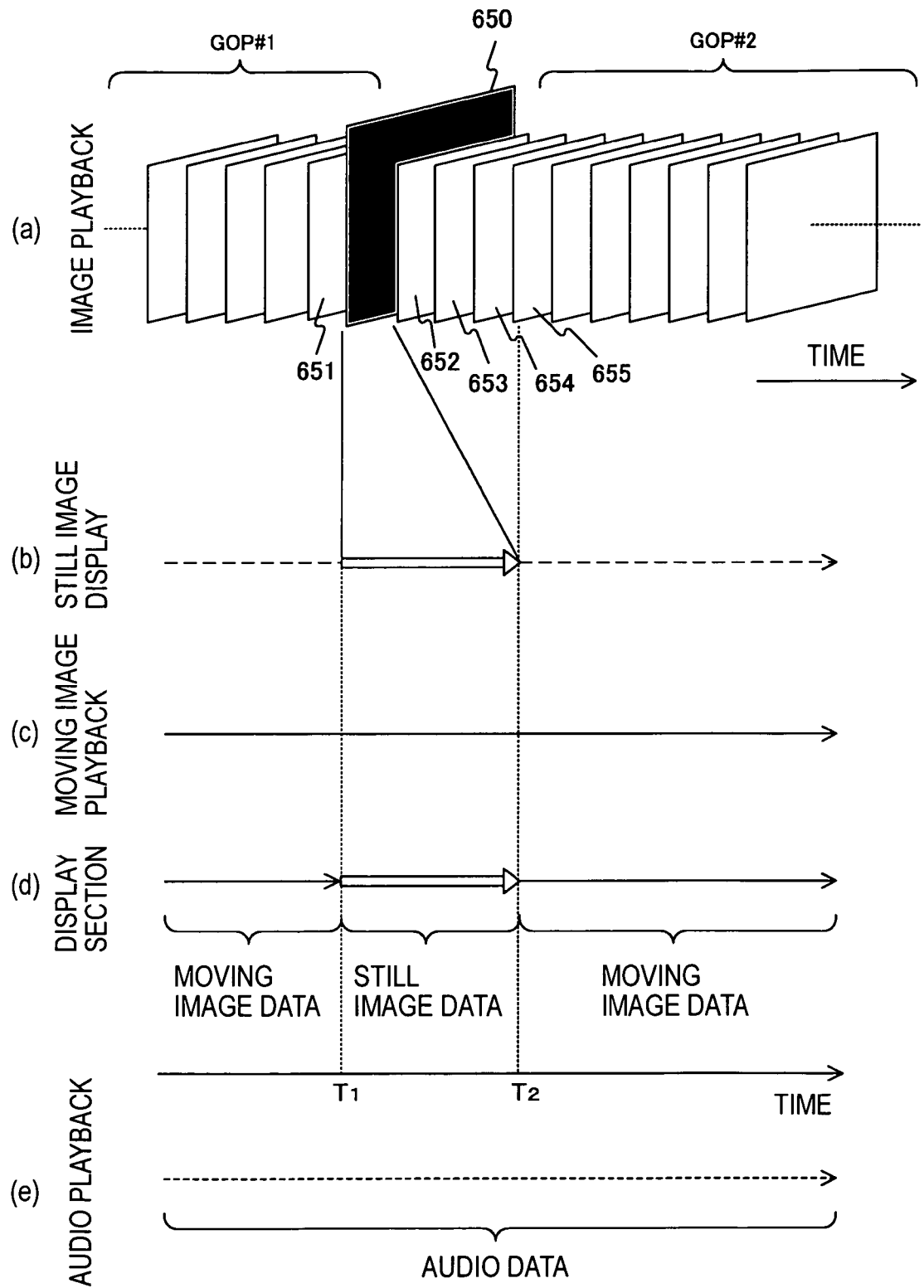
FIG. 9 shows the time relationship among moving image data, still image data, and audio data when these data are played back.

FIG. 9 shows the time relationship when moving image data, still image data, and audio data are played back. Part (a) of FIG. 9 shows the arrangement of moving image data frames and a still image data frame 650 when data held in the data holding section 209 is played back in the image playback control function in the embodiment of the present invention. In part (a) of FIG. 9, it is assumed that the still image data frame 650 is positioned between the final moving image frame B picture 651 of GOP#1, which is a set of moving image data frames; and the first moving image frame I picture 652 of GOP#2, which is a set of moving image data frames.

Part (b) of FIG. 9 shows the time relationship when still image data is played back. The still image data is displayed during only the period from time T1 to time T2. When still image information is contained in the ARI_PCK within the VOBU shown in part (c) of FIG. 7, which is supplied at time T1, the file name of the file containing the still image data recorded in the still image information is referred to. The still image data frame 650 having the file name is arranged and displayed after the final moving image frame B picture 651 of GOP#1. This still image frame 650 is displayed for the time set by the display time setting section 314 shown in FIG. 4.

Part (c) of FIG. 9 shows the time relationship when moving image data is played back. The playback of the moving image data is continued even while the still image display is being displayed. That is, in part (a) of FIG. 9, the I picture 652, the B picture 653, and the B picture 654 are decoded by the moving image decoding section 303 also during the period of time (T2-T1) in which the still image is displayed.

Part (d) of FIG. 9 shows the relationship between data displayed on the display section 42 and time. Until time T1, the moving image data is displayed on the display section 42; from time T1 to time T2, the still image data is displayed on the display section 42; and after time T2, the moving image data is displayed on the display section 42. The reason why the display is performed on the display section 42 in this manner is that, as described above, in the selection section 311 of the image playback control apparatus according to the embodiment of the present invention, data to be displayed on the display section 42 is selected.

During the period of time (T2-T1) in which still image data is displayed as shown in Part (c) of FIG. 9, moving image data is not displayed, but the playback is continued. It is difficult to view the moving image data during the period of time (T2-T1) from the user. Therefore, when a still image is to be displayed, there is no continuity between the moving image data displayed at time T2 at which the display of the still image data is terminated and the moving image data that has been displayed immediately before time T1. That is, in part (a) of FIG. 9, the moving image data corresponding to the I picture 652, the B picture 653, and the B picture 654 is not displayed, and the moving image data corresponding to the I picture 655 and subsequent moving image data are displayed. The period of time (T2-T1) is assumed to be set to, for example, approximately 2.5 seconds.

Part (e) of FIG. 9 shows the relationship between the flow of audio data and time. In Part (e) of FIG. 9, the audio data flows irrespective of the still image data display, and thus, the user hears the audio data similarly to that when the moving image data is normally played back also while the still image data is being displayed. Using the functions of the audio switch 308 and the audio signal indication section 309 shown in FIG. 3, the audio data may not be played back while the still image data is being displayed.

Figure 10:
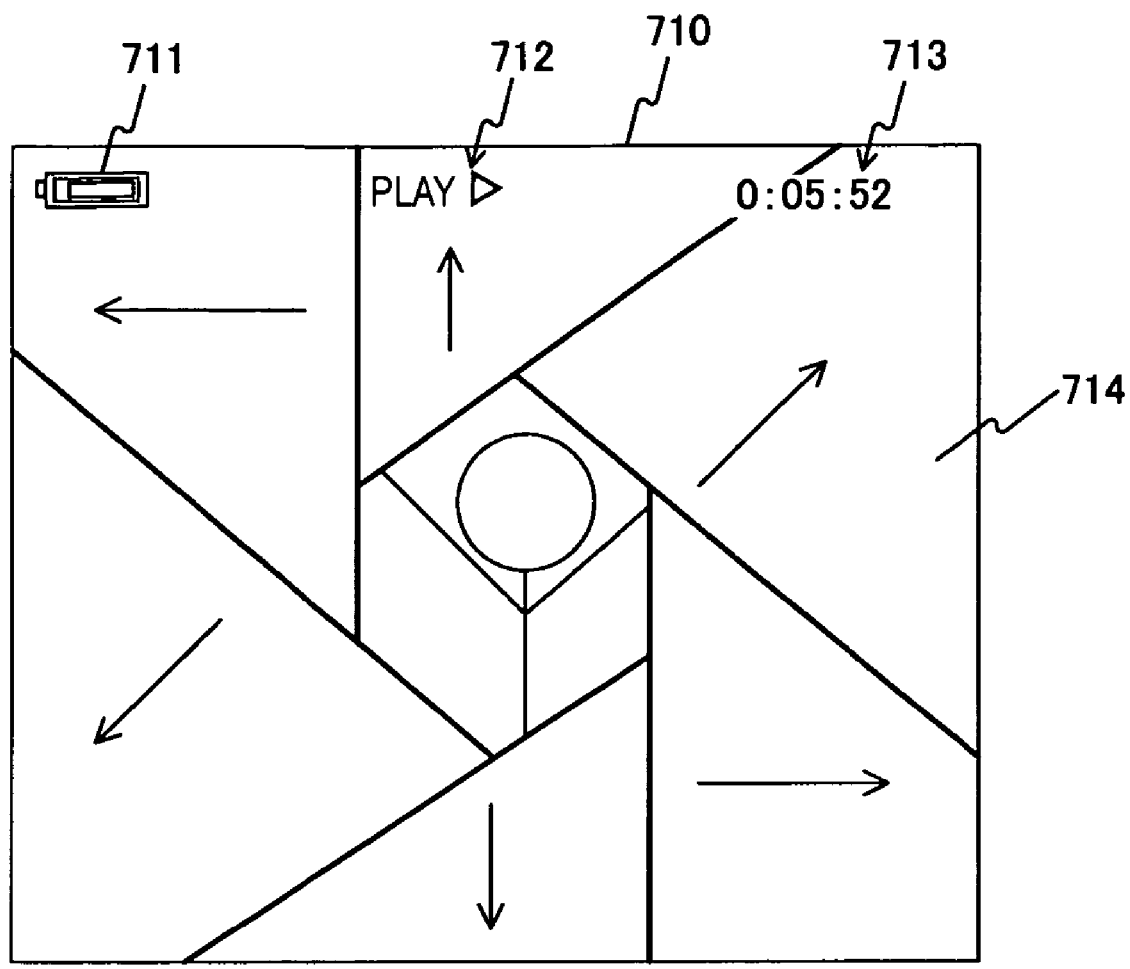
FIG. 10 shows a display format when a shutter screen is used as image effect data in the embodiment of the present invention.

FIG. 10 shows the display format when a shutter screen is used as image effect data in the embodiment of the present invention. On the display screen 710, a battery level display 711 indicating the battery level of the battery section 109, a playback display 712 for displaying the fact that playback is in operation, a playback time display 713, and a shutter screen 714 are displayed. This shutter screen 714 is displayed when still image data is displayed, and more particularly, is displayed immediately before time T1 of FIG. 9. When the shutter screen is begun to be opened in the direction of the arrow shown in the figure, the entire still image is displayed.

As a result of displaying image effect data, such as the shutter screen 714, before the still image data is displayed, the fact that the still image is displayed can be highlighted so that the still image data is visually enhanced.

As an example of sound effect data, shutter sound may also be played back immediately before time T1 of FIG. 9 in synchronization with this shutter screen. As a result of playing back sound effect data such as shutter sound, the still image data can be visually enhanced.

Figure 11:
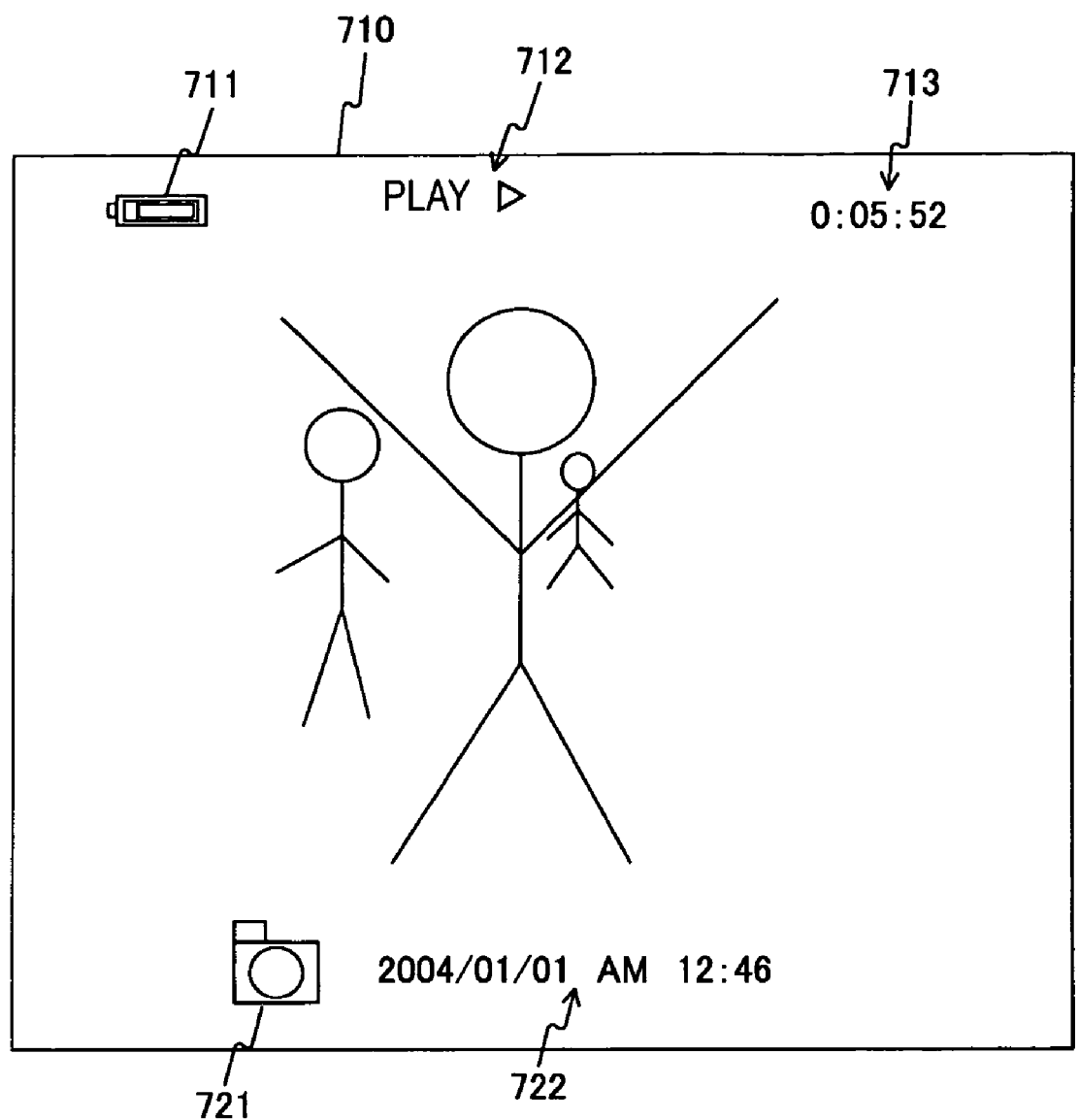
FIG. 11 shows an example of a display format of still image data being played back in the embodiment of the present invention.

FIG. 11 shows an example of the display format of still image data being played back in the embodiment of the present invention. On the display screen 710, the battery level display 711 indicating the level of the battery, the playback display 712 for displaying the fact that playback is in operation, the playback time display 713, a camera mark 721, and a still image capturing date and time 722 are displayed. The camera mark 721 is an example of the image effect data held in the image effect supply section 306 of the image playback control function in the embodiment of the present invention. For the still image capturing date and time 722, for example, the recording time (VOBU_REC_TM) of the ARI_DATA in the additional recording information (ARI_PCK) can be used. Such a camera mark 721 and such a still image capturing date and time 722 are displayed simultaneously to the still image data by, for example, the on-screen display technology.

As a result of displaying the image effect data such as the camera mark 721 together with the still image data, it is possible for the user to recognize that still image data is displayed. Furthermore, as a result of displaying the still image capturing date and time 722 together with the still image data, it is possible to recognize as to when the still image data was photographed.

Figure 12:
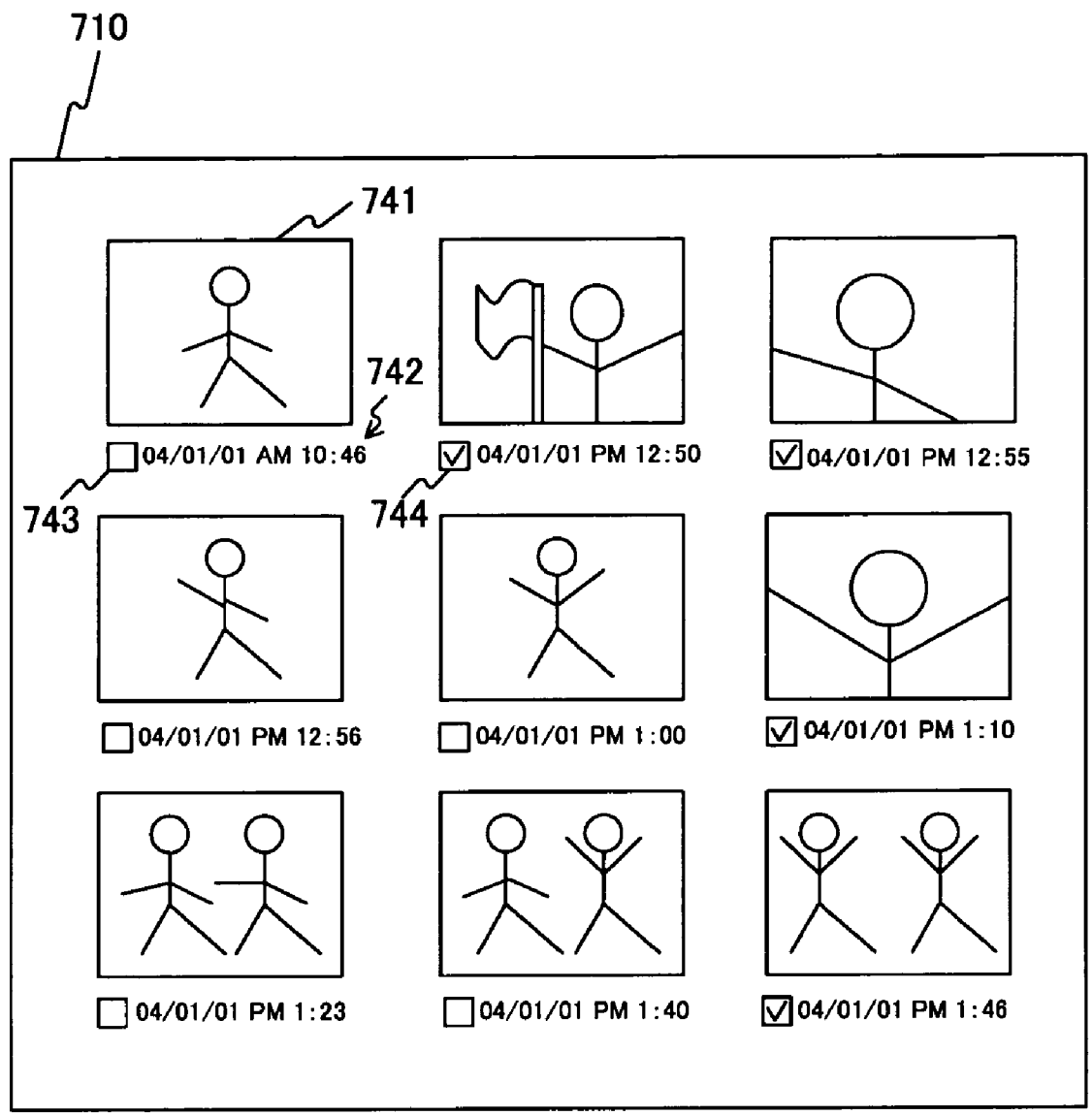
FIG. 12 shows a still image display setting function in the embodiment of the present invention, in the display format of a thumbnail image form.

FIG. 12 shows a still image display setting function in the embodiment of the present invention, in the display format of a thumbnail image form. On the display screen 710, a thumbnail image 741, a still image capturing date and time 742, and a still image display setting confirmation box 743 are displayed. When the user selects a still image desired to be displayed while the moving image is being played back from a touch panel, etc., a check mark 744 is set in the still image display setting confirmation box 743, and only the still image data in which the check mark 744 is set is displayed when the moving image is played back.

If the still image display setting can be set in the thumbnail image form as described above, it is convenient to determine as to which still image data should be displayed by referring to the thumbnail images.

Next, the operation of the apparatus in the embodiment of the present invention will be described below with reference to the drawing.

Figure 13:
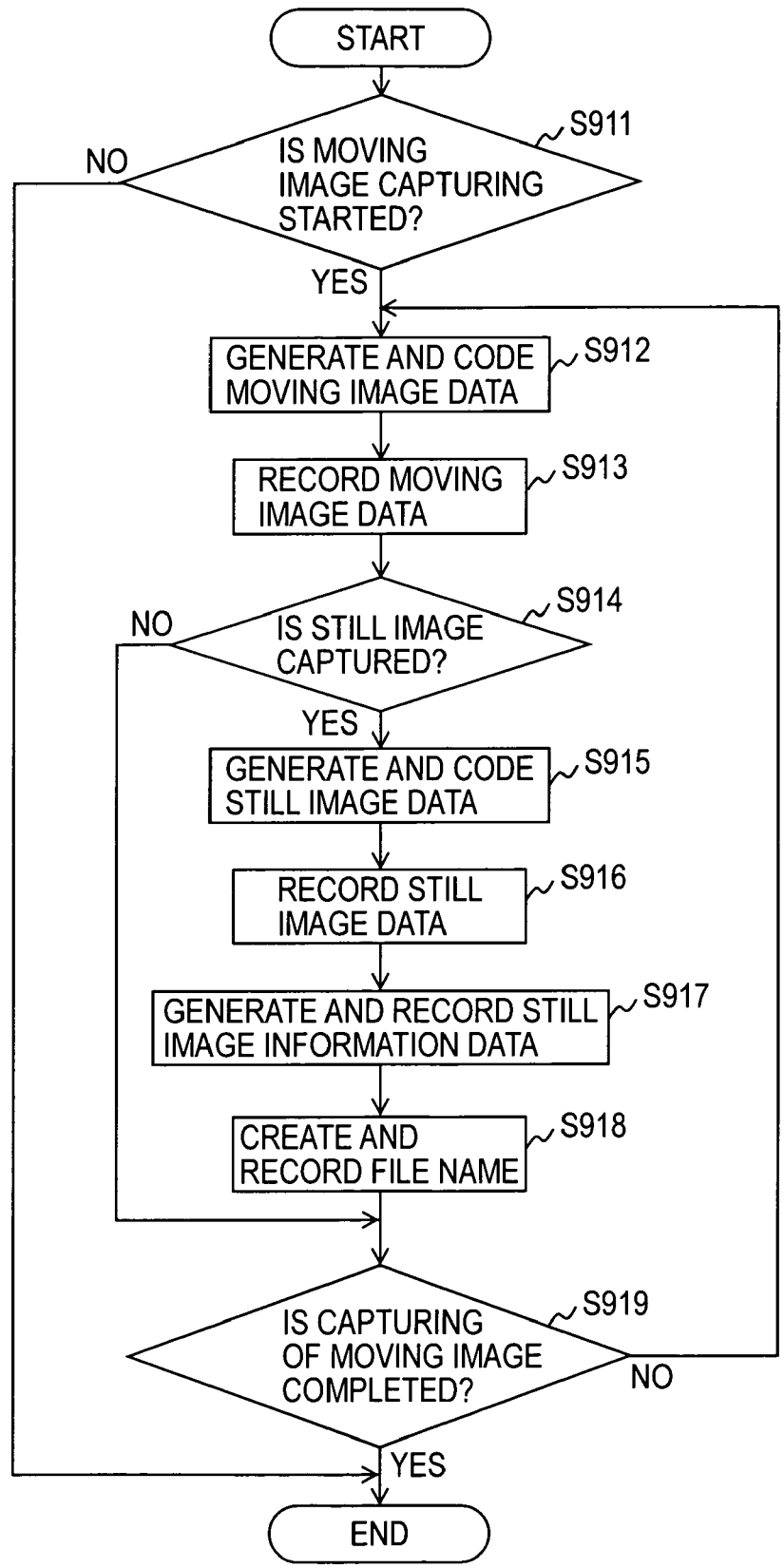
FIG. 13 shows an example of the processing procedure from when moving image data, still image data, and still image information are photographed until these data are recorded in the embodiment of the present invention.

FIG. 13 shows an example of the processing procedure from when moving image data, still image data, and still image information are captured until these are recorded. Initially, the moving image capturing button 105 is depressed to determine whether or not moving image capturing is started (S911). When a moving image is started to be captured, moving image data is generated, and the moving image data is coded (S912). The coded moving image data is recorded in a data holding section (S913).

It is then determined whether or not a still image is to be captured while the moving image is being captured (S914). When the still image has been captured, the still image data is generated, and the still image data is coded (S915). The coded still image data is recorded in the data holding section (S916). When the still image is recorded, still image information is generated and recorded (S917). Next, the file name of the still image data is generated and recorded (S918). This file name of the still image data is contained in the still image information. When the moving image capturing is started, steps S912 to S918 described above are repeated until the moving image capturing is completed (S919).

Figure 14:
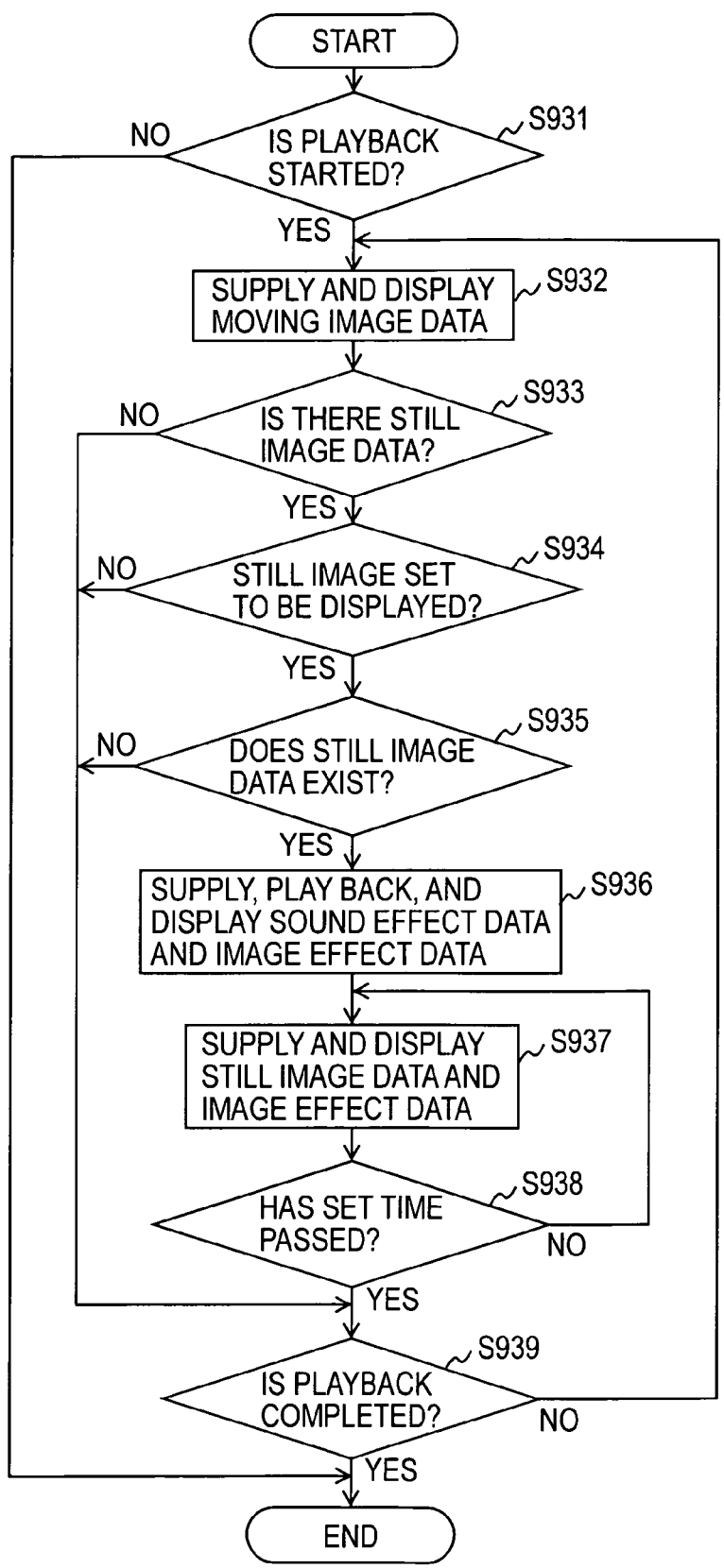
FIG. 14 shows an example of the process procedure for displaying moving image data and still image data in the embodiment of the present invention.

FIG. 14 shows an example of the procedure of a process for displaying moving image data and still image data in the embodiment of the present invention. Initially, it is determined whether or not data is played back (S931). When the data is played back, after moving image data is read from the data holding section, the moving image data is decoded and displayed on the display section (S932).

It is then determined whether or not there is still image information in the data read from the data holding section (S933). When data has been recorded on the basis of the data structure described with reference to FIGS. 5 to 8, it is determined whether or not still image information is contained in the additional recording information (ARI_PCK). If there is no still image information, the operation of step 932 is continued as long as the playback is not completed (S939). When there is the still image information, next, it is determined whether or not a setting has been performed so that a still image is displayed (S934). With regard to this determination, similarly, the still image information in the additional recording information (ARI_PCK) is referred to. When the still image is not set to be displayed, the operation of step 932 is continued as long as the playback is not completed (S939).

When the still image is set to be displayed, it is determined whether or not the still image data itself exists (S935). With regard to this determination, by referring to the file name of the still image data in the still image information, it is determined whether or not still image data having the file name exists. When it is determined that the still image data itself does not exist, the operation of step 932 is continued as long as the playback is not completed (S939).

When it is determined that the still image data itself exists, sound effect data and image effect data are supplied at a predetermined timing, and the data is played back and displayed (S936). The predetermined timing is preferably, for example, immediately before time T1 when the still image data is displayed in FIG. 9. In step S936, immediately before the still image data is displayed, for example, sound effect data such as shutter sound, and image effect data such as a shutter screen, are played back and displayed.

Next, the still image data and the image effect data are supplied and displayed (S937). For the still image data, by referring to the file name of the still image data in the still image information, the still image data to be displayed is supplied. It is then determined whether or not the still image data and the image effect data are displayed for the set period of time (S938). When the data is displayed for the set period of time, the operation of step 932 is continued as long as the playback is not completed (S939).

Next, a description will be given below of an image recording and playback control apparatus according to another embodiment of the present invention.

Figure 15:
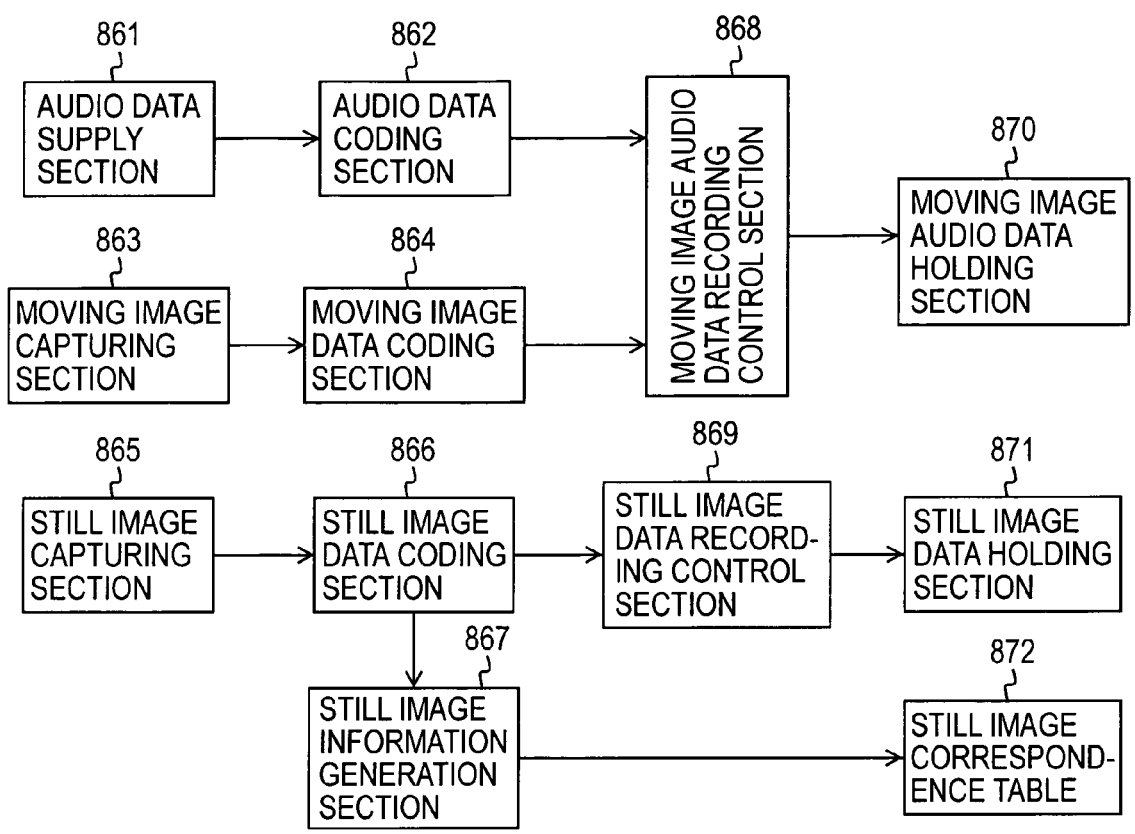
FIG. 15 shows an example of the structure of an image recording function in the embodiment of the present invention.

FIG. 15 shows an example of the image recording function in the other embodiment of the present invention. In the embodiment shown in FIG. 3, the data of the coded audio data, the coded moving image data, the coded still image data, and the still image information is held in the data holding section 209 via the recording control section 208. In comparison, in the other embodiment shown in FIG. 15, the data of the coded audio data and the coded moving image data is held in a moving image audio data holding section 870 via a moving image audio data recording control section 868. The file names of the coded still image data and the coded still image data are held in a still image data holding section 871 via a still image data recording control section 869. The still image information is held in a still image correspondence table 872. The other functions having the same name as that of the image recording function of the embodiment shown in FIG. 3 are identical functions, and accordingly, descriptions thereof are omitted.

The still image information in the other embodiment shown in FIG. 15 contains, in addition to the file names of the still image display information and the still image data, the image-capturing date and time at which a still image was captured. In place of the photographing date and time at which the still image was captured, the recording time (VOBU_REC_TM) of ARI_DATA contained in the additional recording information (ARI_PCK) shown in FIG. 8 in the moving image audio data holding section 870 may be contained. The data structure of the disc when the moving image data and the audio data are recorded on a disc in compliance with the DVD-Video standard in the moving image audio data holding section 870 is such that the still image information within the data structure of the additional recording information (ARI_PCK) of FIG. 8 is omitted, and the other data structure is identical to that of the embodiment shown in FIG. 3.

FIG. 16 shows a still image correspondence table. In the still image correspondence table 872, the still image capturing date and time 881, a still image data file name 882, and a still image display 883 are held in such a manner as to correspond to one another. The still image capturing date and time 881 is the date and time at which a still image was captured, and the date and time can be held in units of one hundredth second. When the recording time (VOBU_REC_TM) of the ARI_DATA contained in the additional recording information (ARI_PCK) shown in FIG. 8 is to be contained in the still image information instead of the image-capturing date and time at which the still image was captured, the recording time (VOBU_REC_TM) of the ARI_DATA is held in the still image correspondence table 872. The still image data file name 882 is the file name of a file containing still image data. The still image display 883 indicates as to whether or not the still image data should be displayed during playback. Information about display/non-display can be held for each still image.

Figure 17:
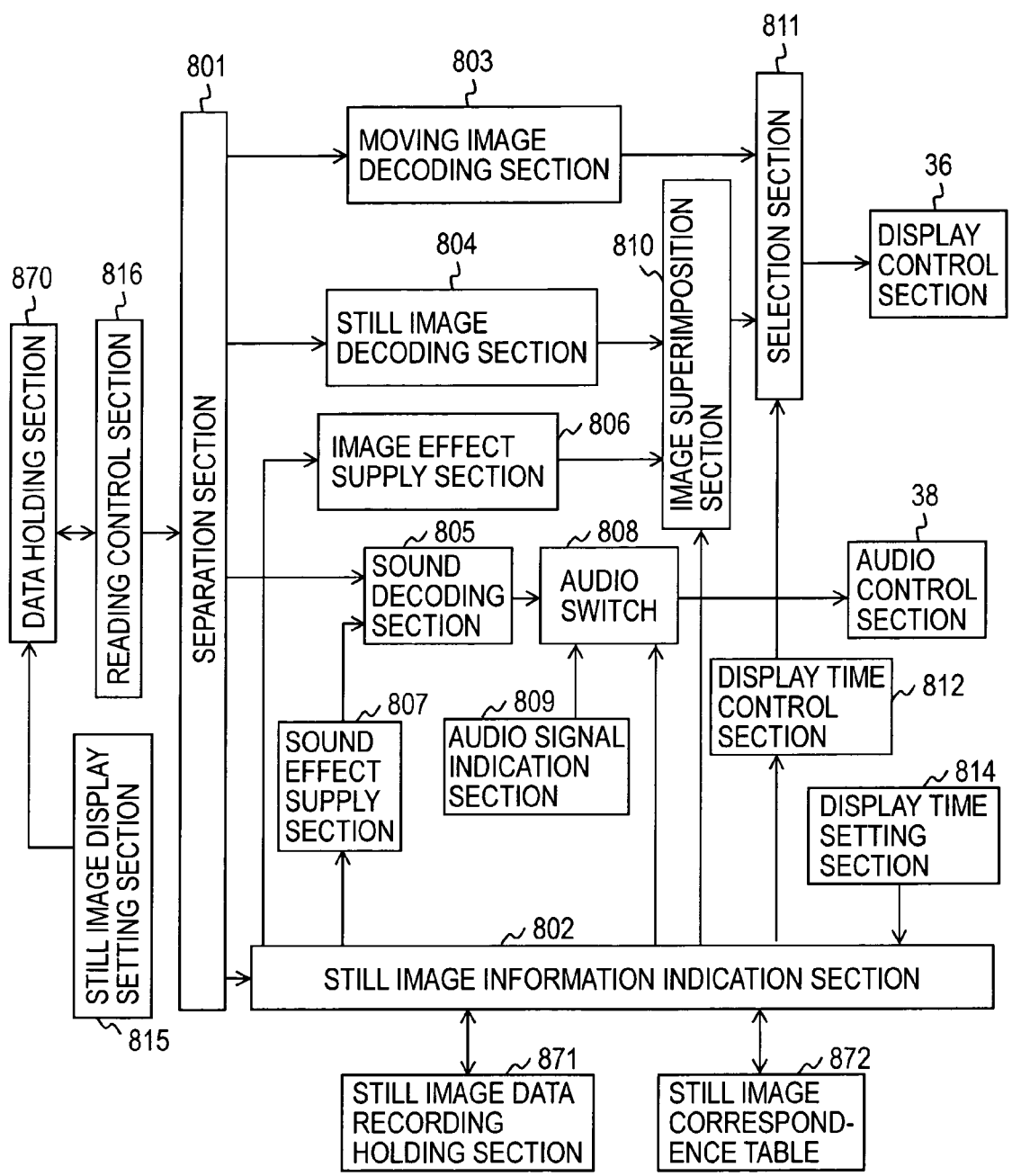
FIG. 17 shows an example of the structure of an image playback control function in the embodiment of the present invention.

FIG. 17 shows an example of the structure of an image playback control function in another embodiment of the present invention. In the other embodiment shown in FIG. 17, the data held in the data holding section 209 in the embodiment shown in FIG. 4 is held by the moving image audio data holding section 870, the still image data holding section 871, and the still image correspondence table 872. Unlike the still image information indication section 302 in the embodiment shown in FIG. 3 controls each of the other function sections on the basis of the still image information, the still image information indication section 802 in the other embodiment shown in FIG. 17 makes instructions to each of the other function sections on the basis of the recording time (VOBU_REC_TM) of the ARI_DATA contained in the additional recording information (ARI_PCK). The other functions having the same name as that of the image playback control function in the embodiment shown in FIG. 4 are identical functions, and accordingly, descriptions thereof are omitted.

A description will now be given, with reference to FIG. 14, of the procedure of a process for displaying moving image data and still image data in the embodiment shown in FIG. 17. Since steps 931 and 932 are identical to those in the other embodiments of the present invention, descriptions thereof are omitted. In step S933, it is determined whether or not the still image capturing date and time corresponding to the recording time (VOBU_REC_TM) of the ARI_DATA contained in the moving image audio data exists in the still image correspondence table 872. The term "still image capturing date and time" corresponding to the recording time (VOBU_REC_TM) of the ARI_DATA refers to, for example, the same still image capturing date and time as the recording time (VOBU_REC_TM) of the ARI_DATA, or the still image capturing date and time, which is after the recording time (VOBU_REC_TM) of the ARI_DATA and which is the nearest still image capturing date and time. Furthermore, when the recording time (VOBU_REC_TM) of the ARI_DATA in place of the still image capturing date and time is recorded in the still image correspondence table 872, for example, it is determined whether or not a record at the same date and time as the recording time (VOBU_REC_TM) of the ARI_DATA contained in the moving image data exists in the still image correspondence table 872.

When it is determined in step S933 that the still image capturing date and time corresponding to the recording time (VOBU_REC_TM) of the ARI_DATA exists in the still image correspondence table 872, the point of making a determination as to whether or not there is still image display information in step 934 is identical to that in the embodiment shown in FIG. 4. With regard to this determination, in the embodiment shown in FIG. 4, still image display information is held in the additional recording information (ARI_PCK). In comparison, in the other embodiment of the present invention, the still image display information is held in the still image correspondence table 872. Therefore, in step 934, the still image correspondence table 872 is referred to.

When it is determined in step 934 that the still image is to be displayed, the point of determining whether or not still image data exists in step 935 is also identical to that in the embodiment shown in FIG. 4. In the other embodiment shown in FIG. 17, it is determined whether or not the still image data corresponding to the file name of the still image data for which a still image is to be displayed is held in the still image data holding section. When it is determined that the still image data is held, after undergoing step 936 similarly to the embodiment shown in FIG. 4, the process of step 937 is performed. Here, in the other embodiment shown in FIG. 17, the still image data is held in the still image data holding section 871. Therefore, the still image data in step 937 is supplied from the still image data holding section 871 via the still image information indication section 802. Since the other processes are identical to those of the embodiment shown in FIG. 4, descriptions thereof are omitted.

The moving image audio data holding section 870 can be mainly realized by, for example, the disc 49 of FIG. 2. The still image data holding section 871 and the still image correspondence table can be mainly realized by, for example, the memory card 43 of FIG. 2.

The embodiments of the present invention describe only examples for embodying the present invention. As discussed below, there is a correspondence between the embodiments and the features of the claims. The present invention is not restricted to the specific embodiments, and various modifications are possible without departing from the spirit and scope of the present invention.

That is, in this embodiment, the moving image capturing means corresponds to, for example, the moving image capturing sections 203 and 863. The still image capturing means corresponds to, for example, the still image capturing sections 205 and 865. The still image information generation means corresponds to, for example, the still image information generation sections 207 and 867. The recording means corresponds to, for example, the recording control section 208, the moving image audio data recording control section 868, and the still image data recording control section 869.

In this embodiment, the still image information indication means corresponds to, for example, the still image information indication sections 302 and 802. The selection means corresponds to, for example, the selection sections 311 and 811. The display control means corresponds to, for example, the display control section 36.

In this embodiment, the display time setting means corresponds to, for example, the display time setting sections 314 and 814.

In this embodiment, the still image display setting means corresponds to, for example, the still image display setting sections 313 and 815.

In this embodiment, the first superposition means corresponds to, for example, the image superposition sections 310 and 810.

In this embodiment, the second superposition means corresponds to, for example, the image superposition sections 310 and 810.

In this embodiment, the audio control means corresponds to, for example, the audio control section 38.

In this embodiment, the sound effect supply means corresponds to, for example, the sound effect supply sections 307 and 807.

In this embodiment, the audio signal indication means corresponds to, for example, the audio signal indication sections 309 and 809. The sound switching means corresponds to, for example, the audio switches 308 and 808.

In this embodiment, the still image information indication means corresponds to, for example, the still image information indication sections 302 and 802. The selection means corresponds to, for example, the selection sections 311 and 811. The display means corresponds to, for example, the display control section 36 and the display section 42.

In this embodiment, the moving image capturing means corresponds to, for example, the moving image capturing sections 203 and 863. The still image capturing means corresponds to, for example, the still image capturing sections 205 and 865. The still image information generation means corresponds to, for example, the still image information generation sections 207 and 867. The moving image coding means corresponds to, for example, the moving image data coding sections 204 and 864. The still image coding means corresponds to, for example, the still image data coding sections 206 and 866. The recording means corresponds to, for example, the recording control section 208, the moving image audio data recording control section 868, and the still image data recording control section 869. The separation means corresponds to, for example, the separation sections 301 and 801. The moving image decoding means corresponds to, for example, the moving image decoding sections 303 and 803. The still image decoding means corresponds to, for example, the still image decoding sections 304 and 804. The still image information indication means corresponds to, for example, the still image information indication sections 302 and 802. The selection means corresponds to, for example, the selection sections 311 and 811. The display control means corresponds to, for example, the display control section 36.

In this embodiment, the moving image capturing procedure corresponds to, for example, step S911 and step S912. The still image capturing procedure corresponds to, for example, step S914 and step S915. The still image information generation procedure corresponds to, for example, step S917 and step S918. The recording procedure corresponds to, for example, step S913, step S916, step S917, and step S918.

In this embodiment, the still image information indication procedure corresponds to, for example, steps S933 to S937. The selection procedure corresponds to, for example, steps S936 to S938. The display control procedure corresponds to, for example, step S936 and step S937.

In this embodiment, the moving image capturing step corresponds to, for example, step S911 and step S912. The still image capturing step corresponds to, for example, step S914 and step S915. The still image information generation step corresponds to, for example, step S917 and step S918. The recording step corresponds to, for example, step S913, step S916, step S917, and step S918.

In this embodiment, the still image information indication step corresponds to, for example, steps S933 to S937. The selection step corresponds to, for example, steps S936 to S938. The display control step corresponds to, for example, step S936 and step S937.

The processing procedure described in the embodiments of the present invention may be understood as a method having the above series of procedures. In addition, the above series of procedures may be considered as a program for enabling a computer to execute the above series of procedures and/or as a recording medium storing the programs.

As examples of utilizations of the present invention, for example, on a sports day for children, the present invention can be applied to a case in which it is desired to record and play back a video image on which a still image is displayed at the instance of crossing the finish line at a timing at which the still image was captured when the finish line is reached while a footrace was being captured.

What is claimed is:

1. An image recording apparatus comprising:
    moving image capturing means for capturing a moving image and generating moving image data including a plurality of frames;
    still image capturing means for capturing a still image and generating still image data, said still image data captured between respective capture of two of said plurality of frames, said still image data not included in said plurality of frames;
    still image information generation means for generating still image information in which the moving image data and the still image data are associated with each other by an image-capturing time;
    recording means for recording the moving image data, the still image data, and the still image information on a recording medium;
    display control means for displaying image data, the display control means replacing at least one frame of the moving image data with the still image data during playback of the moving image data such that the at least one frame of the moving image data is not displayed during the playback of the moving image data; and
    display time setting means for setting a period of time during which the still image data is displayed instead of said moving image data during the playback of the moving image data, wherein selection means selects the still image data for the period of time corresponding to the period of time set by the display time setting means, said still image data replacing said moving image data during the period of time.

2. The image recording apparatus according to claim 1, wherein, in the recording means, the still image information is recorded as additional recording information contained in a video object unit.

3. The image recording apparatus according to claim 1, wherein the still image information contains information in which a file identifier of the still image data is associated with a still image capturing time at which the still image was captured.

4. An image playback control apparatus comprising:
    still image information indication means for indicating moving image data or still image data to be displayed on the basis of still image information in which the moving image data and the still image data are associated with each other by an image-capturing time, said moving image data including a plurality of frames and said still image data captured between respective capture of two of said plurality of frames, said still image data not included in said plurality of frames;

selection means for selecting the moving image data or the still image data to be displayed on the basis of an indication from the still image information indication means; display control means for displaying the moving image data or the still image data selected by the selection means, the display control means replacing at least one frame of the moving image data with the still image data during playback of the moving image data such that the at least one frame of the moving image data is not displayed during the playback of the moving image data; and display time setting means for setting a period of time during which the still image data is displayed instead of said moving image data during the playback of the moving image data, wherein the selection means selects the still image data for the period of time corresponding to the period of time set by the display time setting means, said still image data replacing said moving image data during the period of time.

5. The image playback control apparatus according to claim 4, further comprising:
   still image display setting means for setting the still image data to be displayed, wherein the selection means makes a selection by targeting the still image data set by the still image display setting means.

6. The image playback control apparatus according to claim 4, further comprising:
   first superposition means for displaying the still image data in such a manner that image effect data is superposed on the still image data when the still image data is displayed.

7. The image playback control apparatus according to claim 6, further comprising:
   second superposition means for displaying the still image data in such a manner that the image effect data is superposed on the still image data while the still image data is being displayed.

8. The image playback control apparatus according to claim 4, wherein the still image information is additional recording information contained in a video object unit.

9. The image playback control apparatus according to claim 4, wherein the still image information contains information in which a file identifier of the still image data is associated with a still image capturing time at which the still image was captured.

10. The image playback control apparatus according to claim 4, further comprising:
    audio control means for playing back audio data synchronized with the moving image data.

11. The image playback control apparatus according to claim 10, further comprising:
    sound effect supply means for supplying sound effect data for a predetermined time when the still image data is displayed.

12. The image playback control apparatus according to claim 10, further comprising:
    audio signal indication means for indicating whether or not the audio data is supplied while the still image data is being displayed; and
    audio switching means for switching the audio data on the basis of an indication by the audio signal indication means.

13. An image playback apparatus comprising:
    still image information indication means for indicating moving image data or still image data to be displayed on the basis of still image information in which the moving image data and the still image data are associated with each other by an image-capturing time, said moving image data including a plurality of frames and said still image data captured between respective capture of two of said plurality of frames, said still image data not included in said plurality of frames;
    selection means for selecting the moving image data or the still image data to be displayed on the basis of an indication from the still image information indication means;
    display means for displaying the moving image data or the still image data selected by the selection means, the display means replacing at least one frame of the moving image data with the still image data during playback of the moving image data such that the at least one frame of the moving image data is not displayed during the playback of the moving image data; and
    display time setting means for setting a period of time during which the still image data is displayed instead of said moving image data during the playback of the moving image data, wherein the selection means selects the still image data for the period of time corresponding to the period of time set by the display time setting means, said still image data replacing said moving image data during the period of time.

14. An image recording and playback control apparatus comprising:
    moving image capturing means for capturing a moving image and generating moving image data including a plurality of frames;
    still image capturing means for capturing a still image and generating still image data, said still image data captured between respective capture of two of said plurality of frames, said still image data not included in said plurality of frames;
    still image information generation means for generating still image information in which the moving image data and the still image data are associated with each other by an image-capturing time;
    moving image coding means for coding the moving image data;
    still image data coding means for coding the still image data;
    recording means for recording the coded moving image data, the coded still image data, and the still image information on a recording medium;
    separation means for separating the coded moving image data, the coded still image data, and the still image information, which are recorded, from one another;
    moving image decoding means for decoding the coded moving image data;
    still image decoding means for decoding the coded still image data;
    still image information indication means for indicating the moving image data or the still image data to be displayed on the basis of the still image information;
    selection means for selecting the moving image data or the still image data to be displayed on the basis of an indication from the still image information indication means;
    display control means for displaying the moving image data or the still image data selected by the selection means, the display control means replacing at least one frame of the moving image data with the still image data during playback of the moving image data such that the at least one frame of the moving image data is not displayed during the playback of the moving image data; and display time setting means for setting a period of time during which the still image data is displayed instead of said moving image data during the playback of the moving image data, wherein the selection means selects the still image data for the period of time corresponding to the period of time set by the display time setting means, said still image data replacing said moving image data during the period of time.

15. An image recording method comprising:

capturing a moving image and generating moving image data including a plurality of frames;

capturing a still image and generating still image data, said still image data captured between respective capture of two of said plurality of frames, said still image data not included in said plurality of frames;

generating still image information in which the moving image data and the still image data are associated with each other by an image-capturing time;

recording the moving image data, the still image data, and the still image information on a recording medium; and replacing at least one frame of the moving image data with the still image data during playback of the moving image data such that the at least one frame of the moving image data is not displayed during the playback of the moving image data; and setting a period of time during which the still image data is displayed instead of said moving image data during the playback of the moving image data and selecting the still image data for the period of time corresponding to the period of time set by setting, said still image data replacing said moving image data during the period of time.

16. An image playback control method comprising:

indicating moving image data or still image data to be displayed on the basis of still image information in which the moving image data and the still image data are associated with each other by an image-capturing time, said moving image data including a plurality of frames and said still image data captured between respective capture of two of said plurality of frames, said still image data not included in said plurality of frames;

selecting the moving image data or the still image data to be displayed on the basis of an indication from the indicating;

displaying the moving image data or the still image data selected by the selecting such that at least one frame of the moving image data is replaced with the still image data during playback of the moving image data such that the at least one frame of the moving image data is not displayed during the playback of the moving image data; and setting a period of time during which the still image data is displayed instead of said moving image data during the playback of the moving image data and selecting the still image data for the period of time corresponding to the period of time set by the setting, said still image data replacing said moving image data during the period of time.

17. A non-transitory computer readable medium including computer executable instructions, wherein the instructions, when executed by a processor, cause the processor to perform a method comprising:

capturing a moving image and generating moving image data including a plurality of frames;

capturing a still image and generating still image data, said still image data captured between respective capture of two of said plurality of frames, said still image data not included in said plurality of frames;

generating still image information in which the moving image data and the still image data are associated with each other by an image-capturing time;

recording the moving image data, the still image data, and the still image information on a recording medium; and replacing at least one frame of the moving image data with the still image data during playback of the moving image data such that the at least one frame of the moving image data is not displayed during the playback of the moving image data; and setting a period of time during which the still image data is displayed instead of said moving image data during the playback of the moving image data and selecting the still image data for the period of time corresponding to the period of time set by the setting, said still image data replacing said moving image data during the period of time.

18. A non-transitory computer readable medium including computer executable instructions, wherein the instructions, when executed by a processor, cause the processor to perform a method comprising:

indicating moving image data or still image data to be displayed on the basis of still image information in which the moving image data and the still image data are associated with each other by an image-capturing time, said moving image data including a plurality of frames and said still image data captured between respective capture of two of said plurality of frames, said still image data not included in said plurality of frames;

selecting the moving image data or the still image data to be displayed on the basis of an indication from the indicating;

displaying the moving image data or the still image data selected by the selecting such that at least one frame of the moving image data is replaced with the still image data during playback of the moving image data such that the at least one frame of the moving image data is not displayed during the playback of the moving image data; and setting a period of time during which the still image data is displayed instead of said moving image data during the playback of the moving image data and selecting the still image data for the period of time corresponding to the period of time set by the setting, said still image data replacing said moving image data during the period of time.

19. An image recording apparatus comprising:

a moving image capturing section configured to capture a moving image and to generate moving image data including a plurality of frames;

a still image capturing section configured to capture a still image and to generate still image data, said still image data captured between respective capture of two of said plurality of frames, said still image data not included in said plurality of frames;

a still image information generation section configured to generate still image information in which the moving image data and the still image data are associated with each other by an image-capturing time;

a recording section configured to record the moving image data, the still image data, and the still image information on a recording medium; and a display section configured to display the moving image data, the display section configured to replace at least one frame of the moving image data with the still image data during playback of the moving image data such that the at least one frame of the moving image data is not displayed during the playback of the moving image data; and display time setting section for setting a period of time during which the still image data is displayed instead of said moving image data during the playback of the moving image data, wherein a selection section selects the still image data for the period of time corresponding to the period of time set by the display time setting section, said still image data replacing said moving image data during the period of time.

20. The image recording apparatus according to claim 19, wherein the display section is configured to replace at least two frames of the moving image data with the still image data when displaying the moving image data.

21. An image playback control apparatus comprising:

a still image information indication section configured to indicate moving image data or still image data to be displayed on the basis of still image information in which the moving image data and the still image data are associated with each other by an image-capturing time, said moving image data including a plurality of frames and said still image data captured between respective capture of two of said plurality of frames, said still image data not included in said plurality of frames;

a selection section configured to select the moving image data or the still image data to be displayed on the basis of an indication from the still image information indication section; and a display control section configured to display the moving image data or the still image data selected by the selection section such that at least one frame of the moving image data is replaced with the still image data during playback of the moving image data such that the at least one frame of the moving image data is not displayed during the playback of the moving image data; and display time setting section for setting a period of time during which the still image data is displayed instead of said moving image data during the playback of the moving image data, wherein the selection section selects the still image data for the period of time corresponding to the period of time set by the display time setting section, said still image data replacing said moving image data during the period of time.

22. An image playback apparatus comprising:

a still image information indication section configured to indicate moving image data or still image data to be displayed on the basis of still image information in which the moving image data and the still image data are associated with each other by an image-capturing time, said moving image data including a plurality of frames and said still image data captured between two consecutive frames of said plurality of frames, said still image data not included in said plurality of frames;

a selection section configured to select the moving image data or the still image data to be displayed on the basis of an indication from the still image information indication section;

a display section configured to display the moving image data or the still image data selected by the selection section such that at least one frame of the moving image data is replaced with the still image data during playback of the moving image data such that the at least one frame of the moving image data is not displayed during the playback of the moving image data; and display time setting section for setting a period of time during which the still image data is displayed instead of said moving image data during the playback of the moving image data, wherein the selection section selects the still image data for the period of time corresponding to the period of time set by the display time setting section, said still image data replacing said moving image data during the period of time.

23. An image recording and playback control apparatus comprising:

a moving image capturing section configured to capture a moving image and to generate moving image data including a plurality of frames;

a still image capturing section configured to capture a still image and to generate still image data, said still image data captured between respective capture of two of said plurality of frames, said still image data not included in said plurality of frames;

a still image information generation section configured to generate still image information in which the moving image data and the still image data are associated with each other by an image-capturing time;

a moving image coding section configured to code the moving image data;

a still image data coding section configured to code the still image data;

a recording section configured to record the coded moving image data, the coded still image data, and the still image information on a recording medium;

a separation section configured to separate the coded moving image data, the coded still image data, and the still image information, which are recorded, from one another;

a moving image decoding section configured to decode the coded moving image data;

a still image decoding section configured to decode the coded still image data;

a still image information indication section configured to indicate the moving image data or the still image data to be displayed on the basis of the still image information;

a selection section configured to select the moving image data or the still image data to be displayed on the basis of an indication from the still image information indication section;

a display control section configured to display the moving image data or the still image data selected by the selection section such that at least one frame of the moving image data is replaced with the still image data during playback of the moving image data such that the at least one frame of the moving image data is not displayed during the playback of the moving image data; and display time setting section for setting a period of time during which the still image data is displayed instead of said moving image data during the playback of the moving image data, wherein the selection section selects the still image data for the period of time corresponding to the period of time set by the display time setting section, said still image data replacing said moving image data during the period of time.

* * * * *